United States Patent [19]
Suzuki et al.

[11] Patent Number: 5,237,666
[45] Date of Patent: Aug. 17, 1993

[54] APPARATUS USING ADDRESS OF A PREDETERMINED PRECEDING INSTRUCTION AND TARGET INSTRUCTION ADDRESS STORED IN HISTORY TABLE TO PREFETCH TARGET INSTRUCTION

[75] Inventors: Masato Suzuki, Ikeda; Masahi Deguchi, Nara; Yukinobu Nishikawa, Osaka; Toshimichi Matsuzaki, Minoo; Masaya Miyazaki, Toyonaka; Takashi Sakao, Ibaraki, all of Japan

[73] Assignee: Matsushita Electric Industrial Co., Ltd., Osaka, Japan

[21] Appl. No.: 451,252

[22] Filed: Dec. 15, 1989

[30] Foreign Application Priority Data
Dec. 21, 1988 [JP] Japan ................. 63-322631

[51] Int. Cl.⁵ .................... G06F 9/38; G06F 9/22
[52] U.S. Cl. ................. 395/375; 364/231.8;
364/261.3; 364/261.7; 364/DIG. 1; 364/938;
364/938.2; 364/948; 364/948.34
[58] Field of Search ........................ 395/375

[56] References Cited
U.S. PATENT DOCUMENTS

| | | | |
|---|---|---|---|
| 4,062,058 | 12/1977 | Haynes | 395/400 |
| 4,858,104 | 8/1989 | Matsuo et al. | 395/375 |
| 4,984,154 | 1/1991 | Hanatani et al. | 395/375 |
| 5,121,473 | 6/1992 | Hodges | 395/375 |

FOREIGN PATENT DOCUMENTS
63-88643 4/1988 Japan .

OTHER PUBLICATIONS

J. Cortadella, et al., "Designing a Branch Target Buffer for Executing Branches with Zero Time Cost in a Risc Processor," Microprocessing & Microprogramming, vol. 24, No. 1-5, pp. 573-580, Aug. 1988.

G. S. Rao, "Byte Operand Buffer for Predicting the Outcome of Conditional Branches," IBM Technical Disclosure Bulletin, vol. 25, No. 3A, pp. 1289-1291, Aug. 1982.

J. F. Hughes, et al., "Implementation of a Byte Buffer for IBM 3033 Processor," IBM Technical Disclosure Bulletin, vol. 25, No. 3A, pp. 1236-1237, Aug. 1982.

J. A. DeRosa, et al., "An Evaluation of Branch Architectures," The 14th Annual International Symposium on Computer Architecture, pp. 10-16, Jun. 2-5, 1987.

*Primary Examiner*—Thomas C. Lee
*Assistant Examiner*—Meng-Ai T. An
*Attorney, Agent, or Firm*—Stevens, Davis, Miller & Mosher

[57] ABSTRACT

This data processor makes zero the execution clock count of a branch instruction, a compare instruction, or a compare instruction and following branch instruction when a series of instructions executed in the past is again executed. The data processor of this invention is provided with a history storage unit which stores as its address tag the address of an instruction executed before the branch instruction or compare instruction, and stores the address of an instruction to be executed next the branch or compare instruction or both instruction code of an instruction to be executed next the branch or compare instruction and an address used for pre-fetching an instruction following the instruction code. While the instruction before the branch or compare instruction is decoded, the history storage unit is searched to obtain an instruction to be next executed. The obtained instruction is executed immediately after the execution of the instruction immediately before the branch or compare instruction.

8 Claims, 11 Drawing Sheets

| 401a | 402a | 403a | 409a |
|---|---|---|---|
| ADDRESS OF INSTRUCTION IMMEDIATELY BEFORE BRANCH INSTRUCTION | BRANCH TARGET INSTRUCTION | BRANCH TARGET ADDRESS | VALID BIT |
| | | | |
| | | | |
| | | | |

4a

| ADDRESS OF INSTRUCTION IMMEDIATELY BEFORE BRANCH INSTRUCTION 401a | BRANCH TARGET INSTRUCTION 402a | BRANCH TARGET ADDRESS 403a | VALID BIT 409a |
|---|---|---|---|
| | | | |
| | | | |
| | | | |

4a a : $OP_1$    m : $OP_3$
b : $OP_2$    n : $OP_4$
c : BRA m

FIG. 11

| 401d ADDRESS OF INSTRUCTION IMMEDIATELY BEFORE COMPARE INSTRUCTION | 402d CANDIDATE INSTRUCTION | 403d CANDIDATE ADDRESS | 404d SECONDARY CANDIDATE ADDRESS | 405d COMPARE INSTRUCTION FIRST OPERAND | 406d COMPARE INSTRUCTION SECOND OPERAND | 407d CONDITION CODE | 408d TAKEN BRANCH PREDICTION | 409d VALID BIT |
|---|---|---|---|---|---|---|---|---|
| | | | | | | | | |
| | | | | | | | | |
| | | | | | | | | |

4d

| ADDRESS OF INSTRUCTION IMMEDIATELY BEFORE BRANCH INSTRUCTION | BRANCH TARGET INSTRUCTION | BRANCH TARGET ADDRESS | VALID BIT |
|---|---|---|---|
|  |  |  |  |
|  |  |  |  |
|  |  |  |  | a : $OP_1$       m : $OP_3$
b : $OP_2$       n : $OP_4$
c : Bcc m

APPARATUS USING ADDRESS OF A PREDETERMINED PRECEDING INSTRUCTION AND TARGET INSTRUCTION ADDRESS STORED IN HISTORY TABLE TO PREFETCH TARGET INSTRUCTION

BACKGROUND OF THE INVENTION

The present invention relates to a data processor capable of making zero the execution clock count for a branch instruction, a compare instruction, or a compare instruction with its following branch instruction when a series of instructions executed once is again executed during pipeline processing.

A conventional data processor which executes a branch instruction at high speed is known as shown having the arrangement of FIG. 13. In FIG. 13, reference numeral 11 designates an instruction pre-fetch unit for pre-fetching an instruction code; 12 an instruction decoding unit for decoding an instruction code pre-fetched by the instruction pre-fetch unit 11; 13 an instruction execution unit for executing an instruction in accordance with the control information obtained from the instruction decoding unit 12; 14 a history storage unit for storing a branch target instruction code and its address when a branch instruction is executed; 15 a branch prediction unit for obtaining the branch target instruction code and its address from the history storage unit 14 and outputting them to the instruction decoding unit 12 and instruction pre-fetch unit 11, respectively, prior to the execution of the branch instruction, 16 a branch target comparison unit for comparing the branch target address outputted from the branch prediction unit 15 with the address of an instruction to be executed next the branch instruction; 17 an input-output bus for the connection to a memory, an I/O device and the like; and 18 a bus control unit for controlling the input-output bus 17 under arbitration among data input-output requests from the instruction pre-fetch unit 11 and instruction execution unit 13. FIG. 14 shows the structure of the history storage unit 14 shown in FIG. 13, wherein reference numeral 141 designates an address tag field for storing the address of an instruction executed immediately before a branch instruction; 142 a branch target instruction field for storing an instruction code of a predetermined word length located at the branch target address of a branch instruction; 143 a branch target address field for storing the branch target address of a branch instruction; and 144 a valid bit indicating that the data in the corresponding entry are valid.

In the conventional data processor constructed as above, a branch instruction, if it is executed for the first time is decoded by the instruction decoding unit 12 and thereafter executed at the instruction execution unit 13. If the branch is taken, the branch target address calculated at the instruction execution unit 13 is given to the instruction pre-fetch unit 11 to read a new branch target instruction code. In this case, the history storage unit 14 stores in the address tag field 141 the address of an instruction which was executed immediately before the branch instruction and is held in the instruction execution unit 13, in the branch target address field 143 the branch target address calculated by the instruction execution unit 13, and in the branch target instruction field 142 the read-out branch target instruction code, respectively in the same entry. The valid bit 144 is set to "1" indicating that the data in the entry are valid. Assume that the same branch instruction is thereafter executed again. The instruction decoding unit 12 decodes an instruction immediately before this branch instruction, and at the same time the branch prediction unit 15 searches the history storage unit 14 by using the address of the instruction under decoding. In this case, the address hits the address tag field 141, and the branch prediction unit 15 predicts a taken branch without waiting for the execution of the branch instruction, and obtains the branch target instruction code and its address respectively from the branch target instruction field 142 and branch target address field 143 to send them to the instruction decoding unit 12 and instruction pre-fetch unit 11, respectively. The instruction decoding unit 12 starts decoding the branch target instruction code received from the branch prediction unit 15 immediately after the end of decoding the branch instruction. The instruction pre-fetch unit 11 cancels the pre-fetched instruction and pre-fetches an instruction at the address advanced from the branch target address received from the branch prediction unit 15 by the amount corresponding to the word length of the branch target instruction field 142. After the branch instruction is executed at the instruction execution unit 13 to determine the address of an instruction which is to be executed next the branch instruction, the branch target comparison unit 16 compares the determined address with the branch target address output from the branch prediction unit 15, to thereby verify the branch prediction as true or false. If the comparison result shows a difference therebetween, the valid bit 144 is reset to "0". The instruction decoding unit 12 cancels the instruction under decoding, and the instruction pre-fetch unit 11 cancels the pre-fetched instruction and pre-fetches a new instruction in accordance with the address of the instruction to be executed next the branch instruction, the address having been determined by the instruction execution unit 13. If a branch instruction was taken in the past, there is a high possibility that the same branch instruction is taken when it is executed again. In such a case, the instruction execution 13 can execute the branch target instruction after the execution of the branch instruction, without any wait time.

FIG. 15 is a timing chart illustrating the operation of the data processor described above. Instructions processed in the instruction pre-fetch unit 11, branch prediction unit 15, instruction decoding unit 12, instruction execution unit 13 and branch target comparison unit 16 are illustrated in units of clock. It is assumed herein that the clock count necessary for each unit is one clock. When the branch prediction unit 15 searches at clock t2 the history storage unit 14 in accordance with the address of an instruction (instruction b) immediately before a branch instruction, the address hits the address tag field 141 so that the branch prediction unit 15 sends the branch target instruction code and its address respectively to the instruction decoding unit 12 and instruction pre-fetch unit 11. In this case, however, the instruction decoding unit 12 does not decode it immediately at that time. The presence of the branch instruction (instruction c) is detected at clock t3 upon decoding of the branch instruction by the instruction decoding unit 12. The instruction decoding unit 12 then starts decoding a branch target instruction code (instruction m), and the instruction pre-fetch unit 11 pre-fetches an instruction (instruction n) in accordance with the address advanced from the branch target address by the amount corresponding to the word length of the branch target instruction field 142. The pre-fetch timings other than the instruction n are not shown in FIG. 15. The instruction execution unit 13 executes the branch instruction (instruction c) at clock t4 to determine an actual branch target address. It is compared, at clock t5 by the branch target comparison unit 16, with the branch target address output from the branch prediction unit 15, to thereby verify the branch prediction as true or false. The vertification results show that the prediction was true so that the data processing further continues. The branch target instruction (instruction m) is executed at clock t5.

With the conventional data processor, it is necessary, however, that the instruction decoding unit 12 first decodes the branch instruction and then the instruction execution unit 13 determines the address of an instruction to be executed next the branch instruction. The execution clock count for the branch instruction does not become zero even if the prediction by the branch prediction unit 15 is correct. Further, if the branch instruction is an unconditional branch instruction, the branch is necessarily taken and the verification of the prediction is not needed. However, since the same arrangement is applied also to the unconditional branch instruction, the execution clock count for the unconditional branch instruction does not become zero. Furthermore, with the conventional data processor, a compare instruction is executed by the instruction execution unit 13 so that the execution clock count for a compare instruction, which is present in advance of a branch instruction at high possibility, does not become zero even if the prediction by the branch prediction unit 15 is correct, but takes a predetermined number larger than or equal to one.

SUMMARY OF THE INVENTION

The first invention aims at providing a data processor capable of making zero the execution clock count of an unconditional branch instruction when a series of instructions including the unconditional branch instruction executed in the past is again executed.

In order to achieve the above object, in the data processor of the first invention, there is provided a history storage unit which stores as its address tag the address of an instruction executed before the unconditional branch instruction and stores therein the address of an instruction to be executed next the unconditional branch instruction or both instruction code of an instruction to be executed next the unconditional branch instruction and the address used for reading an instruction following the instruction code. While the instruction before the unconditional branch instruction is decoded, a pre-branch unit searches the history storage unit to obtain an instruction to be executed next the unconditional branch instruction so that the obtained instruction is executed immediately after the execution of the instruction immediately before the unconditional branch instruction.

The second invention aims at providing a data processor capable of making zero the execution clock count of a conditional branch instruction given a true prediction as to a taken branch or not-taken branch, when a series of instructions including the conditional branch instruction executed in the past is again executed.

In order to achieve the above object, in the data processor of the second invention, there is provided a history storage unit which stores as its address tag the address of an instruction executed before the conditional branch instruction and stores therein the address of an instruction to be executed next after the conditional branch instruction or both instruction code of an instruction to be executed next the conditional branch instruction and the address used for reading an instruction following the instruction code, and the condition code for judging the branch of the conditional branch instruction. While the instruction before the conditional branch instruction is decoded, a branch prediction unit searches the history storage unit to predict an instruction to be executed next the conditional branch instruction. In parallel with the execution of the instruction predicted to be executed next the conditional branch instruction, a branch verification unit verifies of the prediction as true or false in accordance with the branch judgement condition code stored in the history storage unit.

The third invention aims at providing a data processor capable of making zero the execution clock count of a compare instruction when a series of instructions including the compare instruction executed in the past is again executed.

In order to achieve the above object, in the data processor of the third invention, there is provided a history storage unit which stores as its address tag the address of an instruction executed before the compare instruction and stores therein the address of an instruction following the compare instruction or both instruction code of an instruction following the compare instruction and the address used for reading an instruction following the instruction code, and the information designating general registers or immediate data for the comparison by the compare instruction. While the instruction before the compare instruction is decoded, a compare instruction remove unit searches the history storage unit to obtain an instruction following the compare instruction. In parallel with the execution of the instruction following the compare instruction, a comparison unit carries out a comparison by using the information designating the general registers or immediate data stored in the history storage unit.

The fourth invention aims at providing a data processor capable of making zero the execution clock count of a compare instruction and following conditional branch instruction given a true prediction as to a taken branch or not-taken branch, when a series of instructions including the compare instruction and following conditional branch instruction executed in the past are again executed.

In order to achieve the above object, in the data processor of the fourth invention, there is provided a history storage unit which stores as its address tag the address of an instruction executed before the compare instruction and stores therein the address of an instruction to be executed next the conditional branch instruction or both instruction code of an instruction to be executed next the conditional branch instruction and the address used for reading an instruction following the instruction code, the information designating general registers or immediate data for the comparison by the compare instruction, and the condition code for judging the branch of the conditional branch instruction. While the instruction before the compare instruction is decoded, a branch prediction unit searches the history storage unit to predict an instruction to be executed next the conditional branch instruction. In parallel with the execution of the instruction predicted to be executed next the conditional branch instruction, a comparison unit carries out a comparison by using the information designating the general registers or immediate data stored in the history storage unit, and a branch verification unit verifies the false/true of the prediction in accordance with the comparison result by the comparison unit and in accordance with the branch judgement condition code stored in the history storage unit.

BRIEF DESCRIPTION OF THE DRAWINGS

FIG. 11 shows the structure of the history storage unit 4d of the data processor of the third embodiment;

DETAILED DESCRIPTION OF THE PREFERRED EMBODIMENTS

Figure 1:
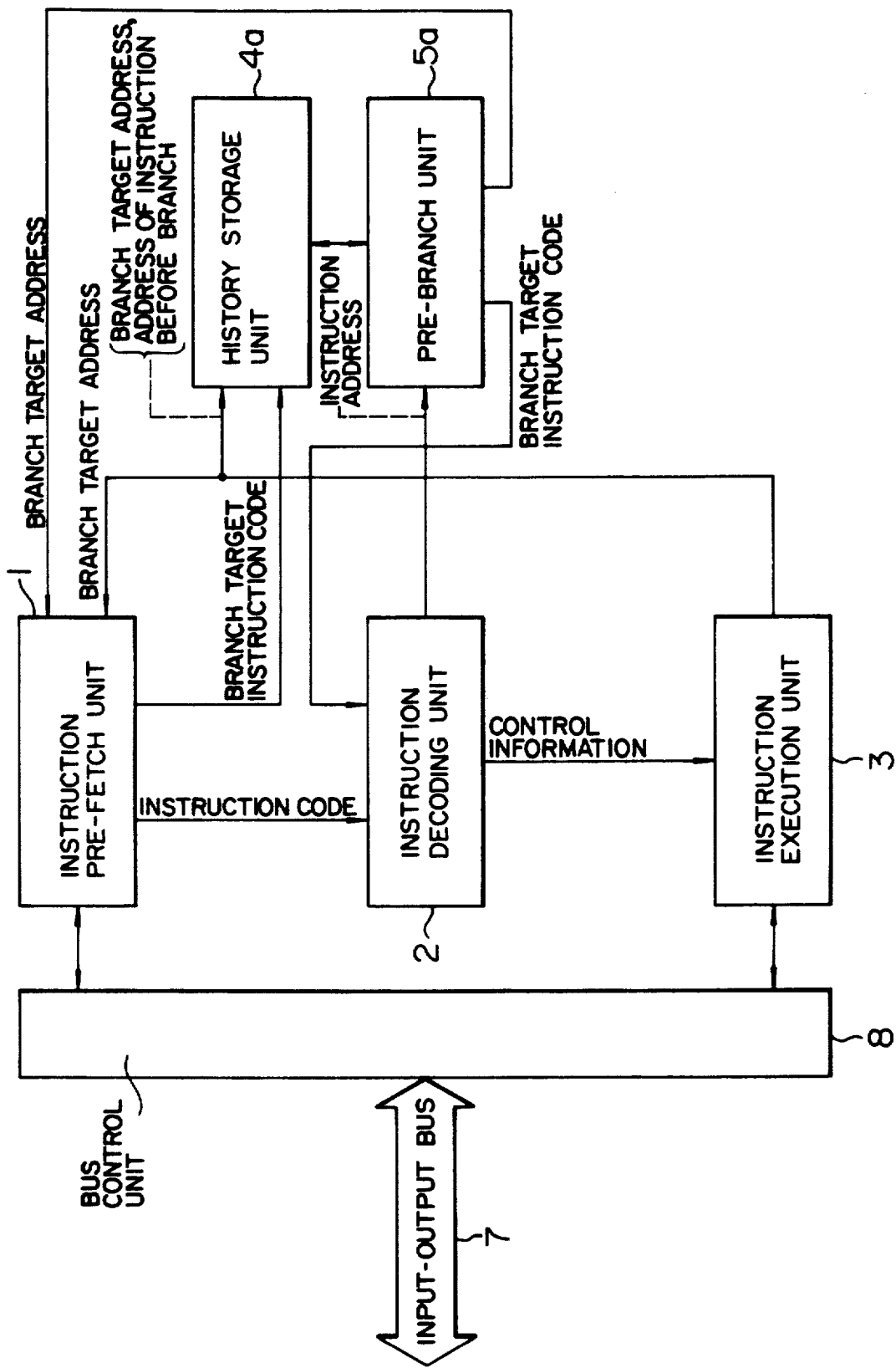
FIG. 1 shows the arrangement of a data processor according to a first embodiment of this invention, capable of making zero the execution clock count for an unconditional branch instruction.
Figures 2, 3:
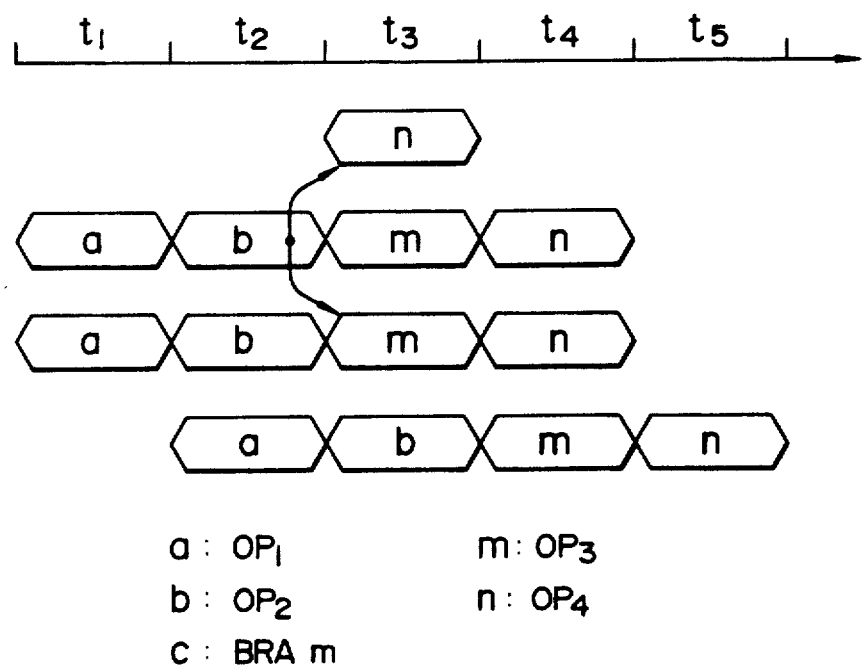
FIG. 2 shows the structure of the history storage unit 4a of the data processor of the first embodiment.
FIG. 3 is a timing chart illustrating the operation of the first embodiment.

FIG. 1 shows the arrangement of a data processor according to a first embodiment of this invention, capable of making zero the execution clock count for an unconditional branch instruction. In FIG. 1, reference numeral 1 designates an instruction pre-fetch unit for pre-fetching an instruction code; 2 an instruction decoding unit for decoding an instruction code pre-fetched by the instruction pre-fetch unit 1; 3 an instruction execution unit for executing an instruction in accordance with the control information obtained from the instruction decoding unit 2; 4a a history storage unit for storing a branch target instruction code and its address of an unconditional branch instruction when the unconditional branch instruction is executed; 5a a pre-branch unit for obtaining from the history storage unit 4a the instruction code and its address of an instruction to be executed next the unconditional branch instruction and outputting them to the instruction decoding unit 2 and instruction pre-fetch unit 1, respectively, prior to the execution of the unconditional branch instruction, 7 an input-output bus for the connection to a memory, an I/O device and the like; and 8 a bus control unit for controlling the input-output bus 7 under arbitration among data input-output requests from the instruction pre-fetch unit 1 and instruction execution unit 3. FIG. 2 shows the structure of the history storage unit 4a shown in FIG. 1, wherein reference numeral 401a designates an address tag field for storing the address of an instruction executed immediately before an unconditional branch instruction; 402a a branch target instruction field for storing an instruction code of a predetermined word length located at the branch target address of an unconditional branch instruction; 403a a branch target address field for storing the branch target address of an unconditional branch instruction; and 409a a valid bit indicating that the data in the corresponding entry are valid.

The operation of the data processor of the first embodiment constructed as above will be described hereinunder.

When an instruction pre-fetched by the instruction pre-fetch unit 1 is decoded by the instruction decoding unit 2, at the same time the pre-branch unit 5a searches the history storage unit 4a in accordance with the address of the instruction under decoding. Even if the instruction under decoding at the instruction decoding unit 2 is an instruction immediately before an unconditional branch instruction, the address tag field 401a of the history storage unit 4a is not hit on condition that the instruction is executed for the first time or that upon execution thereof another instruction causes the entry of the history storage unit 4a to be replaced. If the address tag field 401a is not hit, the data processing is further continued, and the instruction is decoded by the instruction decoding unit 2 and thereafter executed by the instruction execution unit 3.

First, the description will be given for the case where an unconditional branch instruction is executed without hitting the address tag field 401a.

When an unconditional branch instruction is executed by the instruction execution unit 3, this unit 3 calculates the branch target address which is received by the instruction pre-fetch unit 1 to read a new branch target instruction code. In this case, the history storage unit 4a stores in the address tag field 401a the address of an instruction which was executed immediately before the unconditional branch instruction and is held in the instruction execution unit 3, in the branch target instruction field 402a the branch target instruction code pre-fetched by the instruction pre-fetch unit 1, and in the branch target address field 403a the branch target address calculated by the instruction execution unit 3, respectively in the same entry. The valid bit 409a is set to "1" indicating that the data in the entry are valid.

Next, the description will be given for the case where the same unconditional branch instruction is executed after the above-described operation.

The instruction decoding unit 2 decodes an instruction immediately before the unconditional branch instruction, and at the same time the pre-branch unit 5a searches the history storage unit 4a by using the address of the instruction under decoding. In this case, the address hits the address tag field 401a, and without waiting for the execution of the unconditional branch instruction the pre-branch unit 5a obtains the branch target instruction code and its address respectively from the branch target instruction field 402a and branch target address field 403a in accordance with the past history, and sends them to the instruction decoding unit 2 and instruction pre-fetch unit 1, respectively. The instruction decoding unit 2 starts decoding the branch target instruction code received from the pre-branch unit 5a immediately after the end of decoding the instruction immediately before the unconditional branch instruction. The instruction pre-fetch unit 1 cancels the pre-fetched instruction and pre-fetches an instruction at the address advanced from the branch target address received from the pre-branch unit 5a by the amount corresponding to the word length of the branch target instruction field 402a. Thereafter, the processing continues in a usual manner.

FIG. 3 is a timing chart illustrating the operation of the data processor when the address tag field 401a of the history storage unit 4a is hit. Instructions processed in the instruction pre-fetch unit 1, pre-branch unit 5a, instruction decoding unit 2, and instruction execution unit 3 are illustrated in units of clock. It is assumed herein that the clock count necessary for each unit is one clock. When the pre-branch unit 5a searches at clock t2 the history storage unit 4a in accordance with the address of an instruction (instruction b) immediately before an unconditional branch instruction, the address hits the address tag field 401a so that the pre-branch unit 5a sends the branch target instruction code and its address respectively to the instruction decoding unit 2 and instruction pre-fetch unit 1. At clock t3 the instruction decoding unit 2 starts decoding a branch target instruction code (instruction m), and the instruction pre-fetch unit 1 pre-fetches an instruction (instruction n) in accordance with the address advanced from the branch target address by the amount corresponding to the word length of the branch target instruction field 402a. The pre-fetch timings other than the instruction n are not shown in FIG. 3. The instruction execution unit 3 executes the branch target instruction (instruction m) at clock t4. As described above, when the unconditional branch instruction executed in the past is executed again, the branch target instruction (instruction m) is executed immediately after the execution of the instruction (instruction b) immediately before the unconditional branch instruction, thereby making zero the execution clock count for the unconditional branch instruction (instruction c).

As seen from the foregoing description of this embodiment, while an instruction immediately before the unconditional branch instruction is decoded, the pre-branch unit 5a searches the history storage unit 4a by using the address of the instruction under decoding, and obtains the instruction code and its address of an instruction to be executed next the unconditional branch instruction. Without decoding and executing the unconditional branch instruction, the instruction to be executed next after the unconditional branch instruction is decoded and executed after the instruction immediately before the unconditional branch instruction, thereby making zero the execution clock count for the unconditional branch instruction.

The branch target instruction field 402a of the history storage unit 4a in this embodiment may be omitted. In this case, if the address of an instruction under decoding at the instruction decoding unit 2 hits the address tag field 401a, the instruction pre-fetch unit 1 starts pre-fetching an instruction in accordance with the address, obtained by the pre-branch unit 5a, of an instruction to be executed next the unconditional branch instruction. The instruction decoding unit 2 decodes an instruction sent from the instruction pre-fetch unit 1 after decoding the instruction immediately before the unconditional branch instruction.

Further, in this embodiment, the branch target address is stored in the branch target address field 403a. When the address under decoding by the instruction decoding unit 2 hits the address tag field 401a, the instruction pre-fetch unit 1 pre-fetches an instruction at an address advanced from the address obtained from the pre-branch unit 5a by the amount corresponding to the word length of the branch target instruction field 402a. Instead, the branch target address field 403a may store beforehand an address obtained by adding a number corresponding in amount to the word length of the branch target instruction field 402a to the branch target address, so that the instruction pre-fetch unit 1 may be made to start pre-fetching an instruction in accordance with the address obtained by the pre-branch unit 5a, when the address under decoding by the instruction decoding unit 2 hits the address tag field 401a.

Still further, in this embodiment, the address of an instruction immediately before the unconditional branch instruction is stored in the address tag field 401a, and the pre-branch is carried out while the instruction decoding unit 2 decodes the instruction immediately before the unconditional branch instruction. Instead of the instruction immediately before the unconditional branch instruction, any instruction may be used if only it was executed before the unconditional branch instruction.

Figure 4:
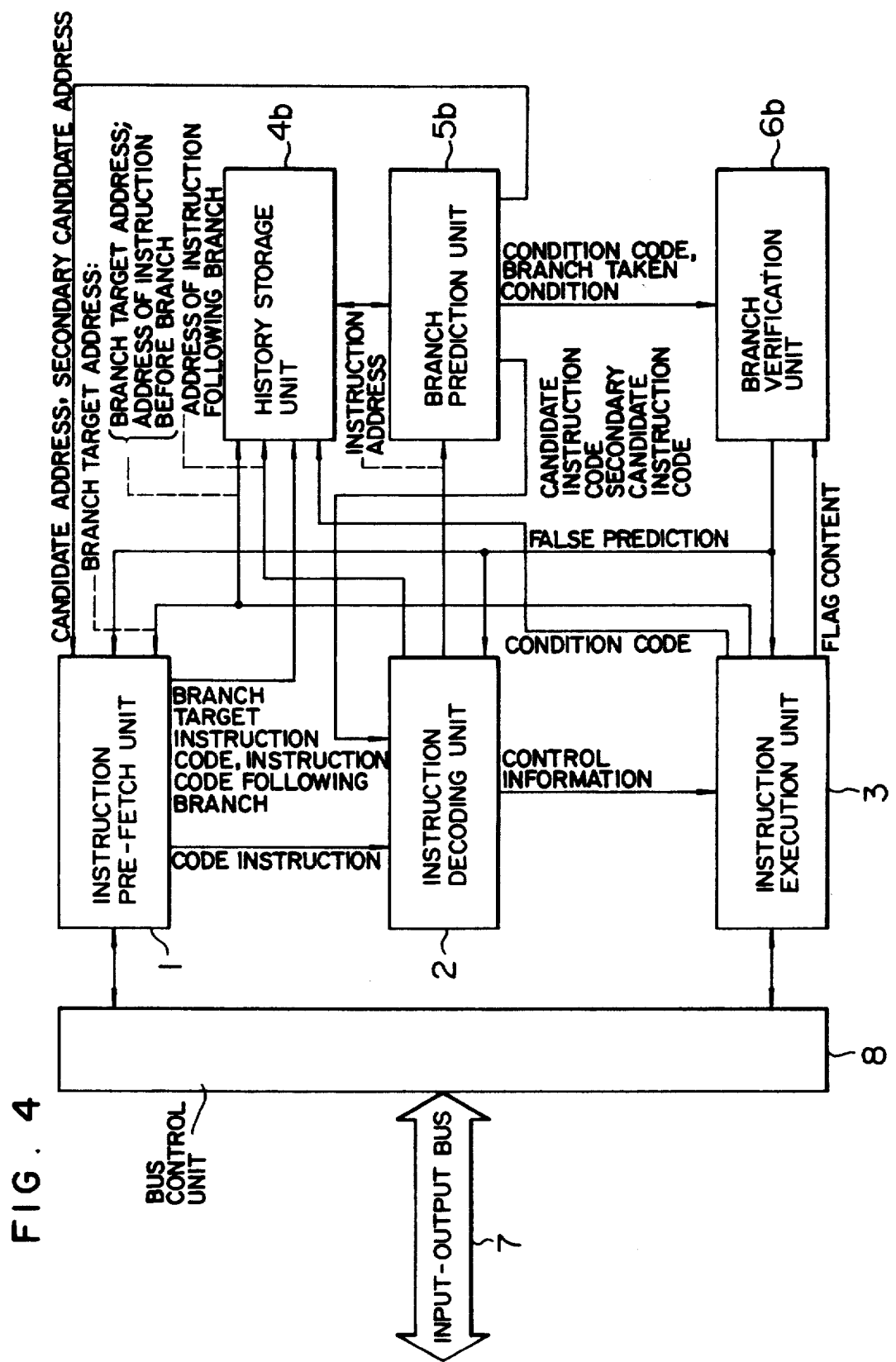
FIG. 4 shows the arrangement of a data processor according to a second embodiment of this invention, capable of making zero the execution clock count for a conditional branch instruction.
Figures 5, 6:
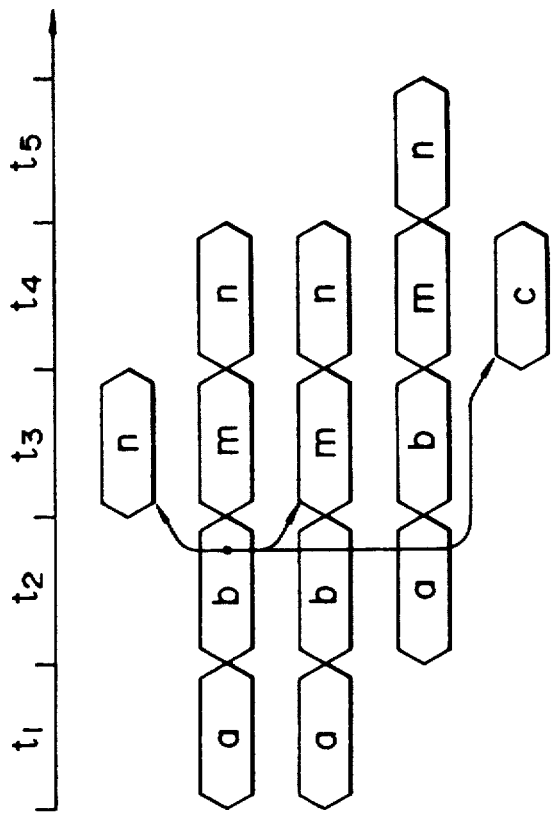
FIG. 5 shows the structure of the history storage unit 4b of the data processor of the second embodiment.
FIG. 6 is a timing chart illustrating the operation of the second embodiment.

FIG. 4 shows the arrangement of a data processor according to a second embodiment of this invention, capable of making zero the execution clock count for a conditional branch instruction. In FIG. 4, reference numeral 1 designates an instruction pre-fetch unit; 2 an instruction decoding unit; 3 an instruction execution unit; 7 an input-output bus; and 8 a bus control unit, all these units having the same structure as shown in FIG. 1. In FIG. 4, reference numeral 4b designates a history storage unit for storing an instruction code and its address of an instruction to be executed next the conditional branch instruction, the address of another instruction executable next the conditional branch instruction, a condition code of the conditional branch instruction, and the information on whether the conditional branch is taken or not taken, respectively when the conditional branch instruction is executed; 5b a branch prediction unit for obtaining from the history storage unit 4b the instruction code and its address of an instruction predicted to be executed next the conditional branch instruction and outputting them to the instruction decoding unit 2 and instruction pre-fetch unit 1, respectively, prior to the execution of the conditional branch instruction; and 6b a branch verification unit for verifying of the branch prediction as true or false in accordance with the condition code of the branch instruction and the information on whether the branch prediction indicates a taken branch or not, respectively received from the branch prediction unit 5b, and in accordance with the information on the status of flags received from the instruction execution unit 3. FIG. 5 shows the format of the history storage unit 4b shown in FIG. 4, wherein reference numeral 401b designates an address tag field for storing the address of an instruction executed immediately before a branch instruction; 402b a candidate instruction field; 403b a candidate address field; and 404b a secondary candidate address field. When the branch of the branch instruction is taken, the fields 402b, 403b and 404b store the instruction code of a predetermined word length located at the branch target address of the branch instruction, the branch target address, and the address of an instruction following the branch instruction, respectively. When the branch of the branch instruction is not taken, the fields 402b, 403b and 404b store the instruction code of a predetermined word length located at the address of the instruction following the branch instruction, the address of the instruction following the branch instruction, and the branch target address of the branch instruction. Reference numeral 407b designates a condition code field for storing a condition code which judges whether the branch of a branch instruction is taken; 408b a taken prediction field which indicates that the branch of a branch instruction is taken; and 409b a valid bit indicating that the data in the corresponding entry are valid.

The operation of the data processor of the second embodiment constructed as above will be described hereinunder.

When an instruction pre-fetched by the instruction pre-fetch unit 1 is decoded by the instruction decoding unit 2, at the same time the branch prediction unit 5b searches the history storage unit 4b in accordance with the address of the instruction under decoding. Even if the instruction under decoding at the instruction decoding unit 2 is an instruction immediately before a branch instruction, the address tag field 401b of the history storage unit 4b is not hit on condition that the instruction is executed for the first time or that upon execution thereof another instruction causes the entry of the history storage unit 4b to be replaced. If the address tag field 401b is not hit, the data processing is further continued, and the instruction is decoded by the instruction decoding unit 2 and thereafter executed by the instruction execution unit 3.

First, the description will be given for the case where a branch instruction is executed without hitting the address tag field 401b, and the branch is taken.

When a branch instruction is executed by the instruction execution unit 3, this unit 3 calculates the branch target address and judges if the branch is taken or not. If the branch is taken, the instruction pre-fetch unit 1 receives the branch target address calculated by the instruction execution unit 3 to thereby pre-fetched a new branch target instruction code. In this case, the history storage unit 4b stores in the address tag field 401b the address of an instruction which was executed immediately before the branch instruction and is held in the instruction execution unit 3, in the candidate instruction field 402b the branch target instruction code pre-fetched by the instruction pre-fetch unit 1, in the candidate address field 403b the branch target address calculated by the instruction execution unit 3, in the secondary candidate address field 404b the address, held in the instruction decoding unit 2, of an instruction following the branch instruction, and in the condition code field 407b the condition code of the branch instruction held in the instruction execution unit 3, respectively in the same entry. The taken prediction field 408b is set to "1" indicating that the branch is taken, and the valid bit 409b is set to "1" indicating that the data in the entry are valid.

Next, the description will be given for the case where the same branch instruction is executed after the above-described operation.

In this case there is an ample possibility of a taken branch so that the following operation is carried out. The instruction decoding unit 2 decodes an instruction immediately before the branch instruction, and at the same time the branch prediction unit 5b searches the history storage unit 4b by using the address of the instruction under decoding. In this case, the address hits the address tag field 401b, and without waiting for the execution of the branch instruction the branch prediction unit 5b predicts a taken branch on the basis of past history, obtains the branch target instruction code and its address respectively from the candidate instruction field 402b and candidate address field 403b, and sends them to the instruction decoding unit 2 and instruction pre-fetch unit 1, respectively. The instruction decoding unit 2 starts decoding the branch target instruction code received from the branch prediction unit 5b immediately after the end of decoding the instruction immediately before the branch instruction. The instruction pre-fetch unit 1 cancels the pre-fetched instruction and pre-fetches an instruction at the address advanced from the branch target address received from the branch prediction unit 5b by the amount corresponding to the word length of the candidate instruction unit 402b. In parallel with the instruction execution unit 3 executing the instruction predicted to be executed next the branch instruction, the branch verification unit 6b verifies of the branch prediction as true or false, in accordance with the condition code of the branch instruction stored in the condition code field 407b and the information on the taken prediction field 408b indicating a taken branch, respectively received from the branch prediction unit 5b, and in accordance with the information on the status of the flags received from the instruction execution unit 3. If this verification indicates that the prediction is true, the processing continues in a usual manner. On the other hand if the verification indicates that the prediction is false, in response to a signal from the branch verification unit 6b, the instruction execution unit 3 cancels the execution results of the instruction predicted to be executed next the branch instruction, the instruction decoding unit 2 cancels the decoding results of the instruction under decoding, and the instruction pre-fetch unit 1 cancels the pre-fetched instruction and receives from the branch prediction unit 5b the address of the instruction following the branch instruction stored in the secondary candidate address field 404b to pre-fetch a new instruction in accordance with the received address. In this case, there is an ample possibility of a not-taken branch if the same branch instruction is again executed. For this reason, the history storage unit 4b replaces the entry whose address tag field 401b was hit, in the following manner. Namely, the candidate instruction field 402b stores the instruction code of the instruction following the branch instruction pre-fetched by the instruction pre-fetch unit 1, the candidate address field 403b stores the contents (the address of the instruction following the branch instruction) previously stored in the secondary candidate address field 404b, the secondary candidate address field 404b stores the contents (the branch target address of the branch instruction) previously stored in the candidate address field 403b, and the taken prediction field 408b is reset to "0" indicating that the branch is not taken.

FIG. 6 is a timing chart illustrating the operation of the data processor when the branch prediction is true. Instructions processed in the instruction pre-fetch unit 1, branch prediction unit 5b, instruction decoding unit 2, and branch verification unit 6b are illustrated in units of clock. It is assumed herein that the clock count necessary for each unit is one clock. When the branch prediction unit 5b searches at clock t2 the history storage unit 4b in accordance with the address of an instruction (instruction b) immediately before a branch instruction, the address hits the address tag field 401b so that the branch prediction unit 5b sends the branch target instruction code and its address respectively to the instruction decoding unit 2 and instruction pre-fetch unit 1. At clock t3 the instruction decoding unit 2 starts decoding a branch target instruction code (instruction m), and the instruction pre-fetch unit 1 pre-fetches an instruction (instruction n) in accordance with the address advanced from the branch target address by the amount corresponding to the word length of the candidate instruction field 402b. The pre-fetch timings other than the instruction n are not shown in FIG. 3. At clock t4, in parallel with the instruction execution unit 3 executing the instruction (instruction m) predicted to be executed next the branch instruction, the branch verification unit 6b verifies of the branch prediction. The verification result indicates that the prediction as true or false is true, so that the processing further conditions. As described above, when the prediction of taken branch is true, the branch target instruction (instruction m) is executed immediately after the execution of the instruction (instruction b) immediately before the branch instruction, thereby making zero the execution clock count for the branch instruction (instruction c).

Next, the description will be given for the case where a branch instruction is executed without hitting the address tag field 401b, and the branch is not taken.

If the branch is not taken, when a branch instruction is executed by the instruction execution unit 3, the history storage unit 4b stores in the address tag field 401b the address of an instruction which was executed immediately before the branch instruction and is held in the instruction execution unit 3, in the candidate instruction field 402b the instruction code of the instruction following the branch instruction pre-fetched by the instruction pre-fetch unit 1, in the candidate address field 403b the address of the instruction following the branch instruction held in the instruction decoding unit 2, in the secondary candidate address field 404b the branch target address of the branch instruction calculated by the instruction execution unit 3, and in the condition code field 407b the condition code of the branch instruction held in the instruction execution unit 3, respectively in the same entry. The taken prediction field 408b is reset to "0" indicating that the branch is not taken, and the valid bit 409b is set to "1" indicating that the data in the entry are valid.

Next, the description will be given for the case where the same branch instruction is executed after the above-described operation.

In this case there is an ample possibility of a not-taken branch s that the following operation is carried out. The instruction decoding unit 2 decodes an instruction immediately before the branch instruction, and at the same time the branch prediction unit 5b searches the history storage unit 4b by using the address of the instruction under decoding. In this case, the address hits the address tag field 401b, and without waiting for the execution of the branch instruction the branch prediction unit 5b predicts a not-taken branch on the basis of past history, obtains the instruction code of the instruction following the branch instruction and its address respectively from the candidate instruction field 402b and candidate address field 403b, and sends them to the instruction decoding unit 2 and instruction pre-fetch unit 1, respectively. The instruction decoding unit 2 starts decoding the instruction code received from the branch prediction unit 5b immediately after the end of decoding the instruction immediately before the branch instruction. The instruction pre-fetch unit 1 cancels the pre-fetched instruction and pre-fetches an instruction at the address advanced from the address received from the branch prediction unit 5b by the amount corresponding to the word length of the candidate instruction unit 402b. In parallel with the instruction execution unit 3 executing the instruction predicted to be executed next the branch instruction, the branch verification unit 6b verifies the branch prediction as true or false, in accordance with the condition code of the branch instruction stored in the condition code field 407b and the information on the taken prediction field 408b indicating a not-taken branch, respectively received from the branch prediction unit 5b, and in accordance with the information on the status of the flags received from the instruction execution unit 3. If this verification indicates that the prediction is true, the processing continues in a usual manner. On the other hand if the verification indicates that the prediction is false, in response to a signal from the branch verification unit 6b, the instruction execution unit 3 cancels the execution results of the instruction predicted to be executed next the branch instruction, the instruction decoding unit 2 cancels the decoding results of the instruction under decoding, and the instruction pre-fetch unit 1 cancels the pre-fetched instruction and receives from the branch prediction unit 5b the branch target address stored in the secondary candidate address field 404b to pre-fetch a new instruction in accordance with the received address. In this case, there is an ample possibility of a taken branch if the same branch instruction is again executed. For this reason, the history storage unit 4b replaces the entry whose address tag field 401b was hit, in the following manner. Namely, the candidate instruction field 402b stores the instruction code of the branch target instruction pre-fetched by the instruction pre-fetch unit 1, the candidate address field 403b stores the contents (the branch target address of the branch instruction) previously stored in the secondary candidate address field 404b, the secondary candidate address field 404b stores the contents (the address of the instruction following the branch instruction) previously stored in the candidate address field 403b, and the taken prediction field 408b is set to "1" indicating that the branch is taken. As described above, also in the case where the prediction of a not-taken branch is true, the instruction following the branch instruction is executed immediately after the execution of the instruction immediately before the branch instruction, thereby making zero the execution clock count for the branch instruction.

As seen from the foregoing description of this embodiment, while an instruction immediately before the branch instruction is decoded, the branch prediction unit 5b searches the history storage unit 4b by using the address of the instruction under decoding, and obtains the instruction code and its address of an instruction to be executed next the branch instruction. Without decoding and executing the branch instruction, the instruction predicted to be executed next the branch instruction is decoded and executed after the instruction immediately before the branch instruction. In parallel with the execution of the instruction predicted to be executed next the branch instruction, the branch verification unit 6b verifies the false/true of the prediction, thereby making zero the execution clock count for the conditional branch instruction with the true prediction, irrespective of either a taken or not-taken branch.

The branch target instruction field 402b of the history storage unit 4b in this embodiment may be omitted. In this case, if the address of an instruction under decoding at the instruction decoding unit 2 hits the address tag field 401b, the instruction pre-fetch unit 1 starts pre-fetching an instruction in accordance with the address, obtained from the branch prediction unit 5b, of an instruction to be executed next the branch instruction. The instruction decoding unit 2 decodes an instruction sent from the instruction pre-fetch unit 1 after decoding the instruction immediately before the branch instruction.

Further, in this embodiment, the branch target address or the address of the instruction following the branch instruction is stored in the candidate address field 403b. When the address of the instruction under decoding by the instruction decoding unit 2 hits the address tag field 401b, the instruction pre-fetch unit 1 starts pre-fetching an instruction at an address advanced from the address obtained from the branch prediction unit 5b by the amount corresponding to the word length of the candidate instruction field 402b. Instead, the candidate address field 403b may store beforehand an address obtained by adding a number corresponding in amount to the word length of the candidate instruction field 402b to the branch target address or the address of the instruction following the branch instruction, so that the instruction pre-fetch unit 1 may be made to start pre-fetching an instruction in accordance with the address obtained from the branch prediction unit 5b, when the address under decoding by the instruction decoding unit 2 hits the address tag field 401b.

Still further, in this embodiment, the address of an instruction immediately before the branch instruction is stored in the address tag field 401b, and the branch prediction is carried out while the instruction decoding unit 2 decodes the instruction immediately before the branch instruction. Instead of the instruction immediately before the branch instruction, any instruction may be used if only it was executed before the branch instruction.

Further, in this embodiment, when the address of an instruction under decoding by the instruction decoding unit 2 hits the address tag field 401b and a taken branch is predicted, the instruction pre-fetch unit 1 cancels the pre-fetched instruction and starts pre-fetching a new branch target instruction. Instead, the first pre-fetched instruction may not be canceled but stored, so that when the prediction becomes false and the branch is not taken, the stored instruction is read out and sent to the instruction decoding unit 2.

Still further, in this embodiment, the history storage unit 4b and branch prediction unit 5b predict the branch of the branch instruction on the basis of the history of the singular latest execution of its branch instruction. Instead, the branch may be predicted on the basis of the history of the plural latest execution of its branch instructions.

Further, in this embodiment, if the branch prediction is judged as false, the contents of the candidate address field 403b are replaced with the contents of the secondary candidate address field 404b. Instead, the branch target address may be stored always in the candidate address field 403b, and the address of the instruction following the branch instruction in the secondary candidate address field 404b, so that when the address under decoding by the instruction decoding unit 2 hits the address tag field 401b, the contents of the candidate address field 403b are sent to the instruction pre-fetch unit 1 if the taken prediction field 408b is "1", and the contents of the secondary address field 404b if "0".

Figure 7:
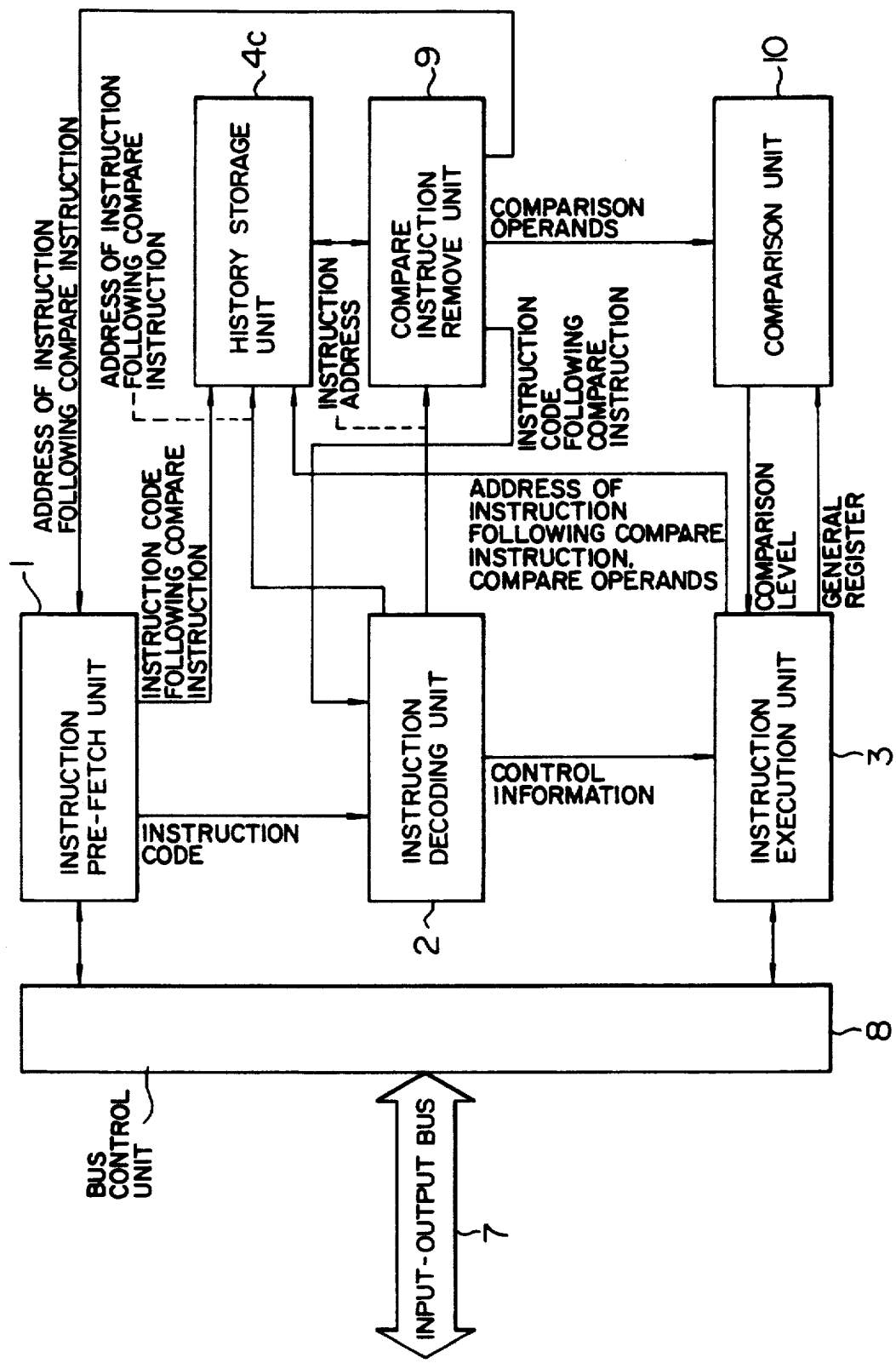
FIG. 7 shows the arrangement of a data processor according to a third embodiment of this invention, capable of making zero the execution clock count for a compare instruction.
Figures 8, 9:
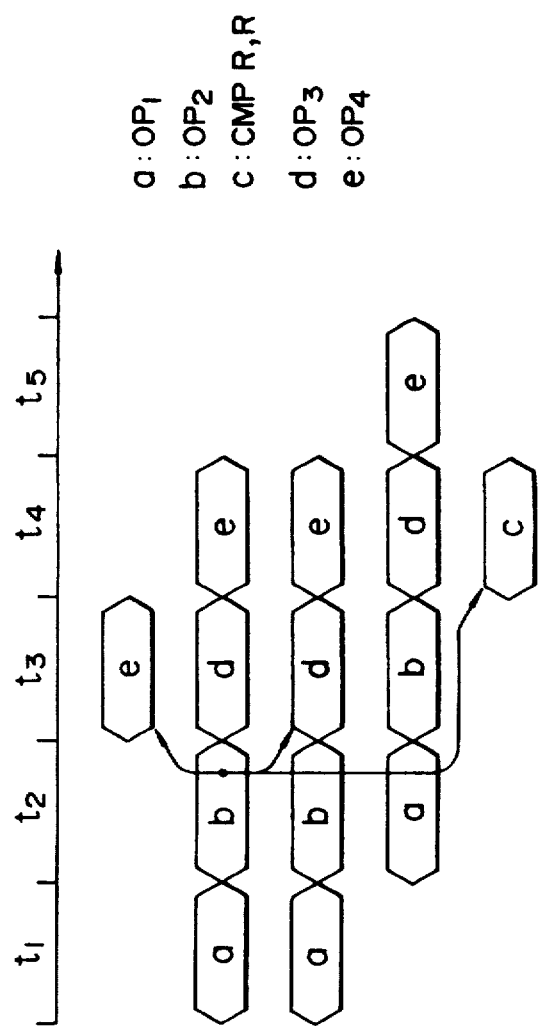
FIG. 8 shows the structure of the history storage unit 4c of the data processor of the third embodiment.
FIG. 9 is a timing chart illustrating the operation of the third embodiment.

FIG. 7 shows the arrangement of a data processor according to a third embodiment of this invention, capable of making zero the execution clock count for a compare instruction. In FIG. 7, reference numeral 1 designates an instruction pre-fetch unit; 2 an instruction decoding unit; 3 an instruction execution unit; 7 an input-output bus; and 8 a bus control unit, all these units having the same structure as shown in FIG. 1. In FIG. 7, reference numeral 4c designates a history storage unit for storing the instruction code and its address of an instruction following a compare instruction, the information on the operands of the compare instruction, respectively when the compare instruction is recorded; 9 a compare instruction remove unit for obtaining from the history storage unit 4c the instruction code and its address of the instruction following the compare instruction, and outputting them to the instruction decoding unit 2 and instruction pre-fetch unit 1, prior to the execution of the compare instruction; and 10 a comparison unit which receives the information on the operands of the compare instruction from the compare instruction remove unit 9 and reads the general registers in the instruction execution unit 3 for the comparison purpose. FIG. 8 shows the structure of the history storage unit 4c shown in FIG. 7, wherein reference numeral 401c designates an address tag field for storing the address of an instruction executed immediately before a compare instruction; 402c a next instruction field for storing an instruction code of a predetermined word length located at the address of the instruction following the compare instruction; 403c a next instruction address field for storing the address of the instruction following the compare instruction; 405c and 406c first and second compare instruction operand fields for storing the information (register numbers) designating general registers if the operands of the compare instruction are general registers, and immediate data if the operands are immediate data; 409c a valid data indicating that the data in the corresponding entry are valid.

The operation of the data processor of the third embodiment constructed as above will be described hereinunder.

When an instruction code pre-fetched by the instruction pre-fetch unit 1 is decoded by the instruction decoding unit 2, at the same time the compare instruction remove unit 9 searches the history storage unit 4c in accordance with the address of the instruction under decoding. Even if the instruction under decoding at the instruction decoding unit 2 is an instruction immediately before a compare instruction, the address tag field 401c of the history storage unit 4c is not hit on condition that the instruction is executed for the first time or that upon execution thereof another instruction causes the entry of the history storage unit 4c to be replaced. If the address tag field 401c is not hit, the data processing is further continued, and the instruction is decoded by the instruction decoding unit 2 and thereafter executed by the instruction execution unit 3.

First, the description will be given for the case where a compare instruction is decoded and executed without hitting the address tag field 401c.

When a compare instruction is executed by the instruction execution unit 3, the history storage unit 4c stores in the address tag field 401c the address of an instruction which was executed immediately before the compare instruction and is held in the instruction execution unit 3, in the next instruction field 402c the instruction code, pre-fetched by the instruction pre-fetch unit 1, of the instruction following the compare instruction, in the next instruction address field 403c the address of the instruction following the compare instruction held in the instruction decoding unit 2, and in the first and second compare instruction operand fields 405c and 406c the information designating general registers or immediate data of the two operands of the compare instruction under the execution by the instruction execution unit 3, respectively in the same entry. The valid bit 409b is set to "1" indicating that the data in the corresponding entry are valid.

Next, the description will be given for the case where the same compare instruction is executed after the above-described operation.

The instruction decoding unit 2 decodes an instruction immediately before the compare instruction, and at the same time the compare instruction remove unit 9 searches the history storage unit 4c by using the address of the instruction under decoding. In this case, the address hits the address tag field 401c. The compare instruction remove unit 9 obtains the instruction code and its address of the instruction following the compare instruction from the next instruction field 402c and next instruction address field 403c, and sends them to the instruction decoding unit 2 and instruction pre-fetch unit 1, respectively. The instruction decoding unit 2 starts decoding the instruction code of the instruction following the compare instruction received from the compare instruction remove unit 9, immediately after the end of decoding the instruction immediately before the compare instruction. The instruction pre-fetch unit 1 cancels the pre-fetched instruction and pre-fetches an instruction at the address advanced from the address of the instruction following the compare instruction received from the compare instruction remove unit 9 by the amount corresponding to the word length of the next instruction field 402c. In parallel with the instruction execution unit 3 executing the instruction following the compare instruction, the comparison unit 10 receives from the compare instruction remove unit 9 the information (register numbers) designating general registers or immediate data of the compare instruction operands respectively stored in the first and second compare instruction operand fields 405c and 406c, and in accordance with the received contents, reads the general registers included in the instruction execution unit 3 for the comparison purpose, the comparison results being reflected upon a flag register included in the instruction execution unit 3. Thereafter, the processing continues in a usual manner.

FIG. 9 is a timing chart illustrating the operation of the data processor when the address tag field 401c of the history storage unit 4c is hit. Instructions processed in the instruction pre-fetch unit 1, compare instruction remove unit 9, instruction decoding unit 2, instruction execution unit 3, and comparison unit 10 are illustrated in units of clock. It is assumed herein that the clock count necessary for each unit is one clock. When the compare instruction remove unit 9 searches at clock t2 the history storage unit 4c in accordance with the address of an instruction (instruction b) immediately before a compare instruction, the address hits the address tag field 401c so that the compare instruction remove unit 9 sends the instruction code and its address of the instruction following the compare instruction, respectively to the instruction decoding unit 2 and instruction pre-fetch unit 1. At clock t3 the instruction decoding unit 2 starts decoding the instruction code of the instruction (instruction d) following the compare instruction, and the instruction pre-fetch unit 1 pre-fetches an instruction (instruction e) in accordance with the address advanced from the address of the instruction following the compare instruction by the amount corresponding to the word length of the next instruction field 402c. The pre-fetch timings other than the instruction e are not shown in FIG. 9. At clock t4, in parallel with the instruction execution unit 3 executing the instruction (instruction d) following the compare instruction, the comparison unit 10 carries out a comparison. As described above, when the compare instruction executed in the past is again executed, the instruction (instruction d) following the compare instruction is executed immediately after the execution of the instruction (instruction b) immediately before the compare instruction, thereby making zero the execution clock count for the compare instruction (instruction c).

As seen from the foregoing description of this embodiment, while an instruction immediately before the compare instruction is decoded, the compare instruction remove unit 9 searches the history storage unit 4c by using the address of the instruction under decoding, and obtain the instruction code and its address of the instruction following the compare instruction. Without decoding and executing the compare instruction, the instruction following the compare instruction is decoded and executed after the instruction immediately before the compare instruction. In parallel with the execution of the instruction following the compare instruction, the comparison unit 10 carries out a comparison, thereby making zero the execution clock count for the compare instruction.

The next instruction field 402c of the history storage unit 4c in this embodiment may be omitted. In this case, if the address of an instruction under decoding at the instruction decoding unit 2 hits the address tag field 401c, the instruction pre-fetch unit 1 starts pre-fetching an instruction in accordance with the address, obtained from the compare instruction remove unit 9, of an instruction following the compare instruction. The instruction decoding unit 2 decodes an instruction sent from the instruction pre-fetch unit 1 after decoding the instruction immediately before the compare instruction.

Further, in this embodiment, the address of the instruction following the compare instruction is stored in the next instruction address field 403c. When the address under decoding by the instruction decoding unit 2 hits the address tag field 401c, the instruction pre-fetch unit 1 starts pre-fetching an instruction at an address advanced from the address obtained from the compare instruction remove unit 9 by the amount corresponding to the word length of the next instruction filed 402c.

Instead, the next instruction address field 403c may store beforehand an address obtained by adding a number corresponding in amount to the word length of the next instruction field 402c to the address of the instruction following the compare instruction, so that the instruction pre-fetch unit 1 may be made to start pre-fetching an instruction in accordance with the address obtained from the compare instruction remove unit 9, when the address under decoding by the instruction decoding unit 2 hits the address tag field 401c.

Still further, in this embodiment, the address of an instruction immediately before the compare instruction is stored in the address tag field 401c, and the compare instruction is removed while the instruction decoding unit 2 decodes the instruction immediately before the compare instruction. Instead of the instruction immediately before the compare instruction, any instruction may be used if only it was executed before the compare instruction.

Figure 10:
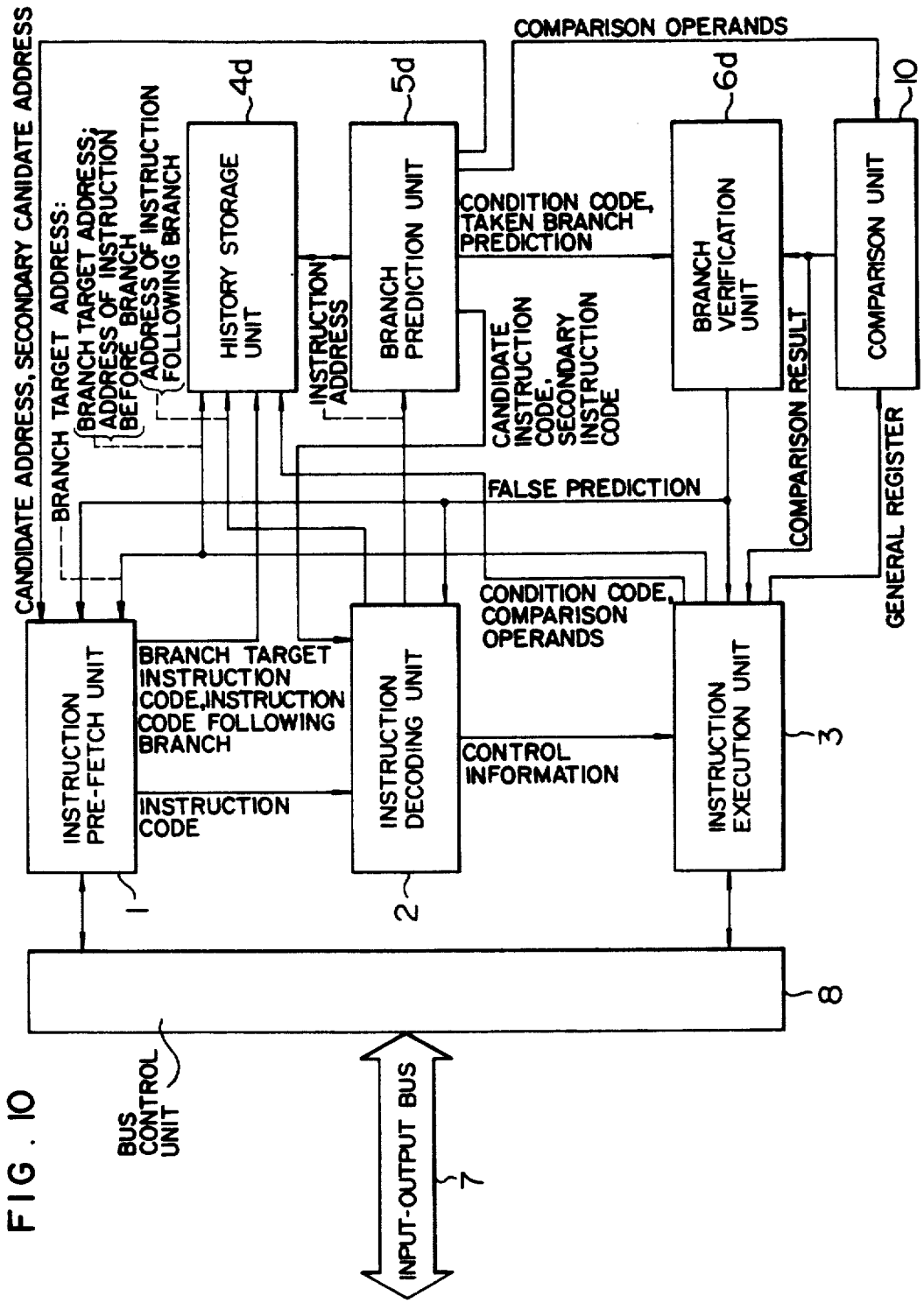
FIG. 10 shows the arrangement of a data processor according to a fourth embodiment of this invention, capable of making zero the execution clock count for a conditional branch instruction and compare instruction.

FIG. 10 shows the arrangement of a data processor according to a fourth embodiment of this invention, capable of making zero the execution clock count for a conditional branch instruction and compare instruction. In FIG. 4, reference numeral 1 designates an instruction pre-fetch unit; 2 an instruction decoding unit; 3 an instruction execution unit; 7 an input-output bus; and 8 a bus control unit, all these units having the same structure as shown in FIG. 1. In FIG. 10, reference numeral 4d designates a history storage unit for storing an instruction code and its address of an instruction to be executed next the conditional branch instruction, the address of another instruction executable next the conditional branch instruction, a condition code of the conditional branch instruction, and the information on whether the conditional branch is taken or not taken, respectively when the conditional branch instruction is executed, and the information on the operands of a compare instruction before the branch instruction; 5d a branch prediction unit for obtaining from the history storage unit 4d the instruction code and its address of an instruction predicted to be executed next the conditional branch instruction and outputting them to the instruction decoding unit 2 and instruction pre-fetch unit 1, respectively, prior to the execution of the branch instruction; 10 a comparison unit for receiving from the branch prediction unit 5d the information on the operands of the compare instruction, and reading general registers in the instruction execution unit 3 in accordance with the received information for performing a comparison; and 6d a branch verification unit for verifying the false/true of the branch prediction in accordance with the condition code of the branch instruction and the information on whether the branch prediction indicates a taken branch or not, respectively received from the branch prediction unit 5d, and in accordance with the comparison result from the comparison unit 10. FIG. 11 shows the structure of the history storage unit 4d shown in FIG. 10, wherein reference numeral 401d designates an address tag field for storing the address of an instruction executed immediately before a compare instruction before a branch instruction; 402d a candidate instruction field; 403d a candidate address field; and 404d a secondary candidate address field. When the branch of the branch instruction after the compare instruction is taken, the fields 402d, 403d and 404d store the instruction code of a predetermined word length located at the branch target address of the branch instruction, the branch target address, and the address of an instruction following the branch instruction, respectively. When the branch of the branch instruction after the compare instruction is not taken, the fields 402d, 403d and 404d store the instructure code of a predetermined word length located at the address of the instruction following the branch instruction, the address of the instruction following the branch instruction, and the branch target address of the branch instruction. 405d and 406d first and second compare instruction operand fields for storing the information (register numbers) designating general registers if the operands of the compare instruction followed by the branch instruction are general registers, and immediate data if the operands are immediate data; Reference numeral 407d designates a condition code field for storing a condition code which judges whether the branch of a branch instruction following the compare instruction is taken; 408d a taken prediction field which indicates that the branch of a branch instruction following the compare instruction is taken; and 409d a valid bit indicating that the data in the corresponding entry are valid.

The operation of the data processor of the fourth embodiment constructed as above will be described hereinunder.

When an instruction pre-fetched by the instruction pre-fetch unit 1 is decoded by the instruction decoding unit 2, at the same time the branch prediction unit 5d searches the history storage unit 4d in accordance with the address of the instruction under decoding. Even if the instruction under decoding at the instruction decoding unit 2 is an instruction immediately before a compare instruction before a branch instruction, the address tag field 401d of the history storage unit 4d is not hit on condition that the instruction is executed for the first time or that upon execution thereof another instruction causes the entry of the history storage unit 4d to be replaced. If the address tag field 401d is not hit, the data processing is further continued, and the instruction is decoded by the instruction decoding unit 2 and thereafter executed by the instruction execution unit 3.

First, the description will be given for the case where a branch instruction following the compare instruction is executed without hitting the address tag field 401d, and the branch is taken.

When a branch instruction is executed by the instruction execution unit 3, this unit 3 calculates the branch target address and judges if the branch is taken or not. If the branch is taken, the instruction pre-fetch unit 1 receives the branch target address calculated by the instruction execution unit 3 to thereby pre-fetch a new branch target instruction code. In this case, the history storage unit 4d stores in the address tag field 401d the address of an instruction which was executed immediately before the compare instruction and is held in the instruction execution unit 3, in the candidate instruction field 402d the branch target instruction code pre-fetched by the instruction pre-fetch unit 1, in the candidate address field 403d the branch target address calculated by the instruction execution unit 3, in the secondary candidate address field 404d the address, held in the instruction decoding unit 2, of an instruction following the branch instruction, in the first and second compare instruction operand fields 405d and 406d the information designating general registers or immediate data of the two operands of the compare instruction held in the instruction execution unit 3, and in the condition code field 407d the condition code of the branch instruction held in the instruction execution unit 7, respectively in the same entry. The taken prediction field 408d is set to "1" indicating that the branch is taken, and the valid bit 409d is set to "1" indicating that the data in the entry are valid.

Next, the description will be given for the case where the same compare instruction and the following same branch instruction are executed after the above-described operation.

In this case there is an ample possibility of a taken branch so that the following operation is carried out. The instruction decoding unit 2 decodes an instruction immediately before the compare instruction, and at the same time the branch prediction unit 5d searches the history storage unit 4d by using the address of the instruction under decoding. In this case, the address hits the address tag field 401d, and without waiting for the execution of the branch instruction the branch prediction unit 5d predicts a taken branch on the basis of past history, obtains the branch target instruction code and its address respectively from the candidate instruction field 402d and candidate address field 403d, and sends them to the instruction decoding unit 2 and instruction pre-fetch unit 1, respectively. The instruction decoding unit 2 starts decoding the branch target instruction code received from the branch prediction unit 5d immediately after the end of decoding the instruction immediately before the compare instruction. The instruction pre-fetch unit 1 cancels the pre-fetched instruction and pre-fetches an instruction at the address advanced from the branch target address received from the branch prediction unit 5d by the amount corresponding to the word length of the candidate instruction unit 402d. In parallel with the instruction execution unit 3 executing the instruction predicted to be executed next the branch instruction, the comparison unit 10 receives from the branch prediction unit 5d the information (register numbers) designating general registers or immediate data of the compare instruction operands respectively stored in the first and second compare instruction operand fields 405d and 406d, and in accordance with the received contents, reads the general registers included in the instruction execution unit 3 for the comparison purpose, the comparison results being reflected upon a flag register included in the instruction execution unit 3. Also, in parallel with the execution of the instruction execution unit 3, the branch verification unit 6d verifies the branch prediction as true or false, in accordance with the comparison result and in accordance with the condition code of the branch instruction stored in the condition code field 407d and the information on the taken prediction field 408d indicating a taken branch, respectively received from the branch prediction unit 5d. If this verification indicates that the prediction is true, the processing continues in a usual manner. On the other hand, if the verification indicates that the prediction is false, in response to a signal from the branch verification unit 6d, the instruction execution unit 3 cancels the execution results of the instruction predicted to be executed next the branch instruction, the instruction decoding unit 2 cancels the decoding results of the instruction under decoding, and the instruction pre-fetch unit 1 cancels the pre-fetched instruction and receives from the branch prediction unit 5d the address of the instruction following the branch instruction stored in the secondary candidate address field 404d to pre-fetch a new instruction in accordance with the received address. In this case, there is an ample possibility of a not-taken branch if the same compare instruction and following branch instruction are again executed. For this reason, the history storage unit 4d replaces the entry whose address tag field 401d was hit, in the following manner. Namely, the candidate instruction field 402d stores the instruction code of the instruction following the branch instruction pre-fetched by the instruction pre-fetch unit 1, the candidate address field 403d stores the contents (the address of the instruction following the branch instruction) previously stored in the secondary candidate address field 404d, the secondary candidate address field 404d stores the contents (the branch target address of the branch instruction) previously stored in the candidate address field 403d, and the taken prediction field 408d is reset to "0" indicating that the branch is not taken.

Figure 12:
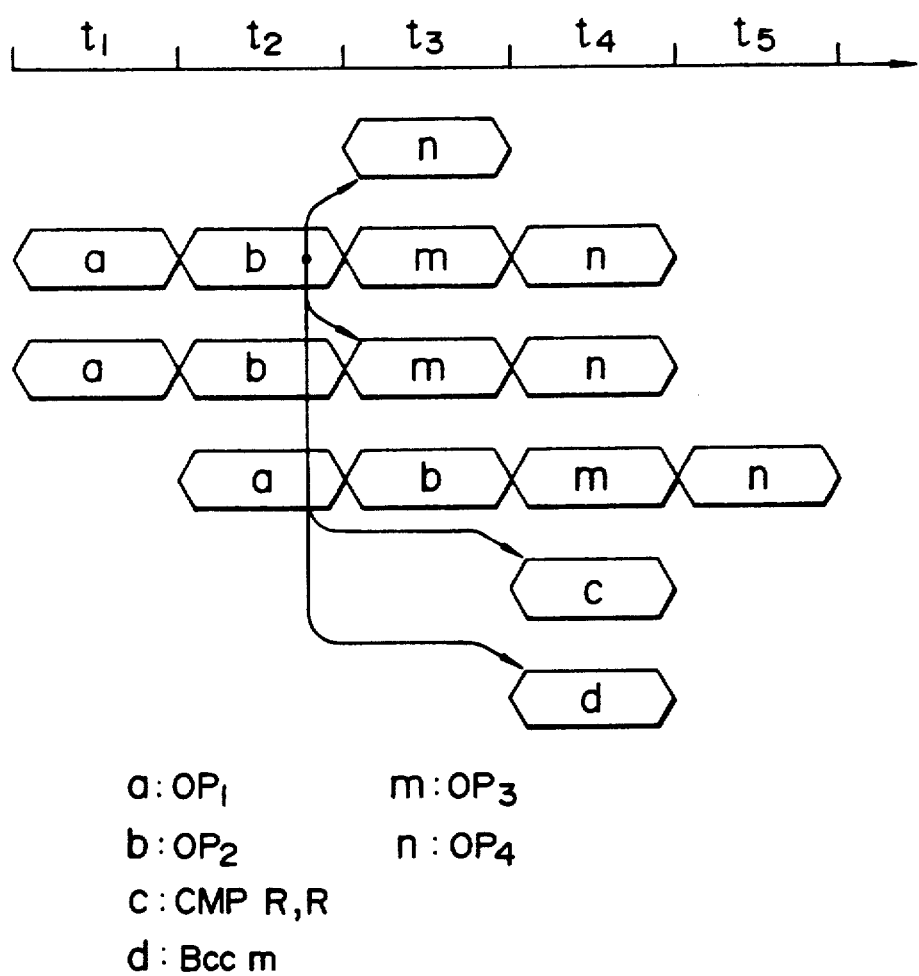
FIG. 12 is a timing chart illustrating the operation of the fourth embodiment.
Figure 13:
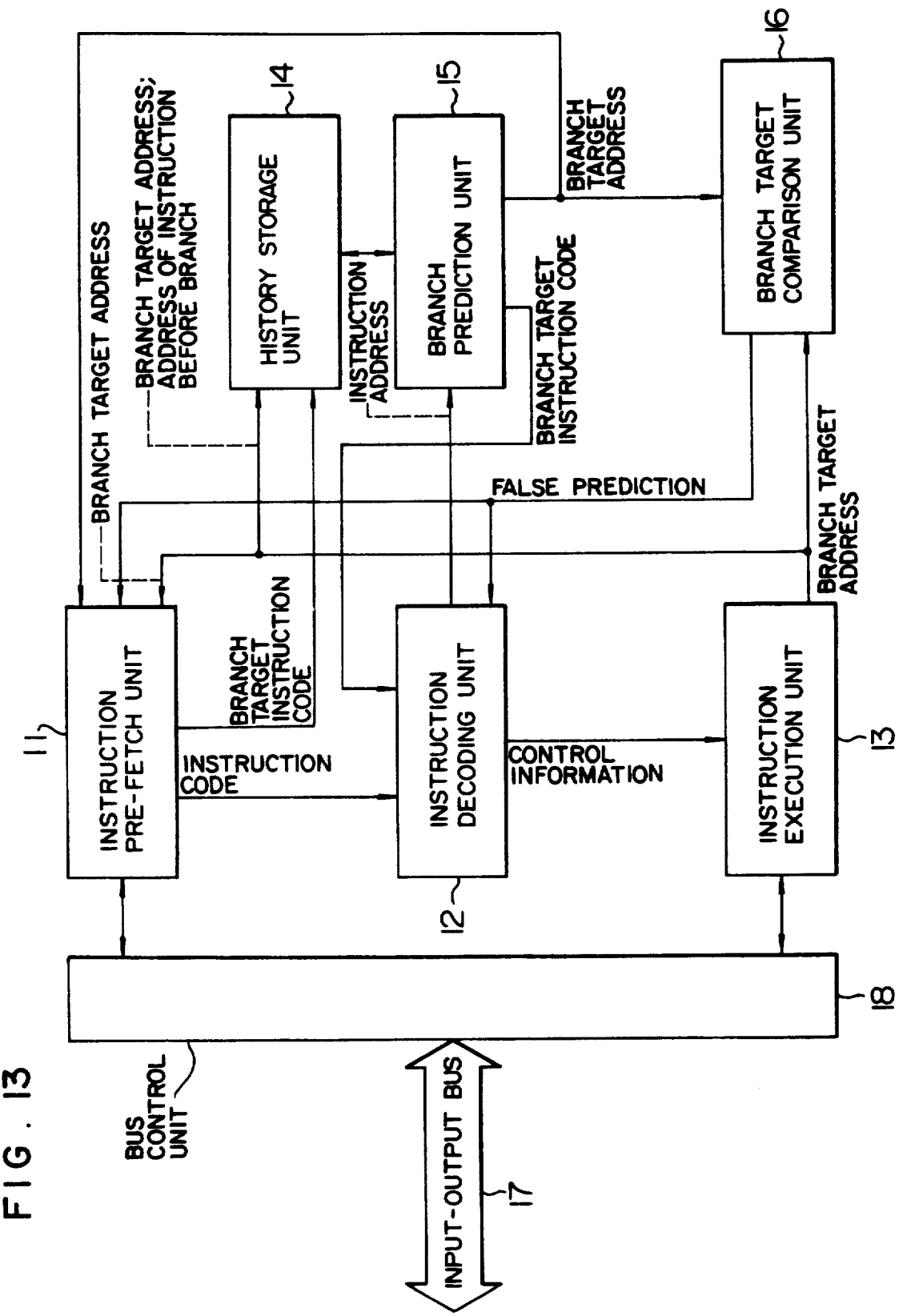
FIG. 13 shows the arrangement of a conventional data processor executing a branch instruction at high speed.
Figures 14, 15:
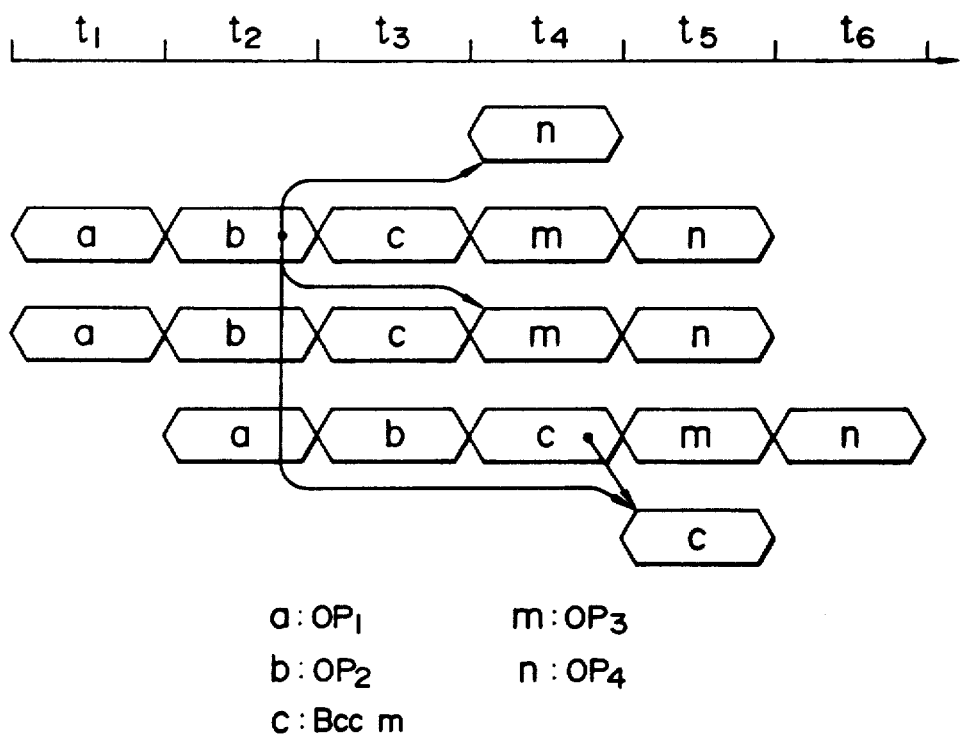
FIG. 14 shows the structure of the history storage unit of the conventional data processor shown in FIG. 13.
FIG. 15 is a timing chart illustrating the operation of the conventional data processor shown in FIG. 13.

FIG. 12 is a timing chart illustrating the operation of the data processor when the branch prediction is true. Instructions processed in the instruction pre-fetch unit 1, branch prediction unit 5d, instruction decoding unit 2, instruction execution unit 3, comparison unit 10, and branch verification unit 6d are illustrated in units of clock. It is assumed herein that the clock count necessary for each unit is one clock. When the branch prediction unit 5d searches at clock t2 the history storage unit 4d in accordance with the address of an instruction (instruction b) immediately before a compare instruction, the address hits the address tag field 401d so that the branch prediction unit 5d sends the branch target instruction code and its address respectively to the instruction decoding unit 2 and instruction pre-fetch unit 1. At clock t3 the instruction decoding unit 2 starts decoding a branch target instruction code (instruction m), and the instruction pre-fetch unit 1 pre-fetches an instruction (instruction n) in accordance with the address advanced from the branch target address by the amount corresponding to the word length of the candidate instruction field 402d. The pre-fetch timings other than the instruction n are not shown in FIG. 12. At clock t4, in parallel with the instruction execution unit 3 executing the instruction (instruction m) predicted to be executed next the branch instruction, the comparison unit 10 carries out a comparison and the branch verification unit 6d verifies the branch prediction as true or false. The verification result indicates that the prediction is true, so that the processing further continues. As described above, when the prediction of taken branch is true, the branch target instruction (instruction m) is executed immediately after the execution of the instruction (instruction b) immediately before the compare instruction, thereby making zero the execution clock count for the branch instruction (instruction d) and compare instruction (instruction c) before the branch instruction.

Next, the description will be given for the case where a branch instruction following the compare instruction is executed without hitting the address tag field 401b, and the branch is not taken.

If the branch is not taken, when a branch instruction is executed by the instruction execution unit 3, the history storage unit 4d stores in the address tag field 401d the address of an instruction which was executed immediately before the compare instruction and is held in the instruction execution unit 3, in the candidate instruction field 402d the instruction code of the instruction following the branch instruction pre-fetched by the instruction pre-fetch unit 1, in the candidate address field 403d the address of the instruction following the branch instruction held in the instruction decoding unit 2, in the secondary candidate address field 404d the branch target address of the branch instruction calculated by the instruction execution unit 3, in the first and second compare instruction operand fields 405d and 406d the information designating the general registers or immediate data of the two operands of the compare instruction held in the instruction execution unit 3, and in the condition code field 407d the condition code of the branch instruction held in the instruction execution unit 3, respectively in the same entry. The taken prediction field 408d is reset to "0" indicating that the branch is not taken, and the valid bit 409d is set to "1" indicating that the data in the entry are valid.

Next, the description will be given for the case where the same compare instruction and following branch instruction are executed after the above-described operation.

In this case there is an ample possibility of a not-taken branch so that the following operation is carried out. The instruction decoding unit 2 decodes an instruction immediately before the compare instruction, and at the same time the branch prediction unit 5d searches the history storage unit 4d by using the address of the instruction under decoding. In this case, the address hits the address tag field 401d, and without waiting for the execution of the branch instruction the branch prediction unit 5d predicts a not-taken branch on the basis of past history, obtains the instruction code of the instruction following the branch instruction and its address respectively from the candidate instruction field 402d and candidate address field 403d, and sends them to the instruction decoding unit 2 and instruction pre-fetch unit 1, respectively. The instruction decoding unit 2 starts decoding the instruction code received from the branch prediction unit 5d immediately after the end of decoding the instruction immediately before the compare instruction. The instruction pre-fetch unit 1 cancels the pre-fetched instruction and pre-fetches an instruction at the address advanced from the address received from the branch prediction unit 5d by the amount corresponding to the word length of the candidate instruction unit 402d. In parallel with the instruction execution unit 3 executing the instruction predicted to be executed next the branch instruction, the comparison unit 10 receives from the branch prediction unit 5d the information (register numbers) designating general registers or immediate data of the compare instruction operands respectively stored in the first and second compare instruction operand fields 405d and 406d, and in accordance with the received contents, reads the general registers included in the instruction execution unit 3 for the comparison purpose, the comparison results being reflected upon the flag register included in the instruction execution unit 3. Also, in parallel with the execution of the instruction execution unit 3, the branch verification unit 6d verifies the branch prediction as true or false, in accordance with the comparison result and in accordance with the condition code of the branch instruction stored in the condition code field 407d and the information on the taken prediction field 408d indicating a not-taken branch, respectively received from the branch prediction unit 5d. If this verification indicates that the prediction is true, the processing continues in a usual manner. On the other hand, if the verification indicates that the prediction is false, in response to a signal from the branch verification unit 6d, the instruction execution unit 3 cancels the execution results of the instruction predicted to be executed next the branch instruction, the instruction decoding unit 2 cancels the decoding results of the instruction under decoding, and the instruction pre-fetch unit 1 cancels the pre-fetched instruction and receives from the branch prediction unit 5d the branch target address stored in the secondary candidate address field 404d to pre-fetch a new instruction in accordance with the received address. In this case, there is an ample possibility of a taken branch if the same compare instruction and following branch instruction are again executed. For this reason, the history storage unit 4d replaces the entry whose address tag field 401d was hit, in the following manner. Namely, the candidate instruction field 402b stores the instruction code of the branch target instruction pre-fetched by the instruction pre-fetch unit 1, the candidate address field 403d stores the contents (the branch target address of the branch instruction) previously stored in the secondary candidate address field 404d, the secondary candidate address field 404d stores the contents (the address of the instruction following the branch instruction) previously stored in the candidate address field 403d, and the taken prediction field 408d is set to "1" indicating that the branch is taken. As described above, also in the case where the prediction of a not-taken branch is true, the instruction following the branch instruction is executed immediately after the execution of the instruction immediately before the compare instruction, thereby making zero the execution clock count for the compare instruction and following branch instruction.

As seen from the foregoing description of this embodiment, while an instruction immediately before the compare instruction is decoded, the branch prediction unit 5d searches the history storage unit 4d by using the address of the instruction under decoding, and obtains the instruction code and its address of an instruction to be executed next the branch instruction. Without decoding and executing the compare and branch instructions, the instruction predicted to be executed next the branch instruction is decoded and executed after the instruction immediately before the compare instruction. In parallel with the execution of the instruction predicted to be executed next the branch instruction, the comparison unit 10 and branch verification unit 6d perform a comparison and a verification of the prediction as true or false, thereby making zero the execution clock count for the compare instruction and following conditional branch instruction with the true prediction, irrespective of either a taken or not-taken branch.

The branch target instruction field 402d of the history storage unit 4d in this embodiment may be omitted. In this case, if the address of an instruction under decoding at the instruction decoding unit 2 hits the address tag field 401d, the instruction pre-fetch unit 1 starts pre-fetching an instruction in accordance with the address, obtained from the branch prediction unit 5d, of an instruction to be executed next the branch instruction. The instruction decoding unit 2 decodes an instruction sent from the instruction pre-fetch unit 1 after decoding the instruction immediately before the compare instruction.

Further, in this embodiment, the branch target address or the address of the instruction following the branch instruction is stored in the candidate address field 403d. When the address under decoding by the instruction decoding unit 2 hits the address tag field 401d, the instruction pre-fetch unit 1 starts pre-fetching an instruction at an address advanced from the address obtained from the branch prediction unit 5d by the amount corresponding to the word length of the candidate instruction field 402d. Instead, the candidate address field 403d may store beforehand an address obtained by adding a number corresponding in amount to the word length of the candidate instruction field 402d to the branch target address or the address of the instruction following the branch instruction, so that the instruction pre-fetch unit 1 may be made to start pre-fetching an instruction in accordance with the address obtained from the branch prediction unit 5d, when the address under decoding by the instruction decoding unit 2 hits the address tag field 401d.

Still further, in this embodiment, the address of an instruction immediately before the compare instruction is stored in the address tag field 401d, and the branch prediction is carried out while the instruction decoding unit 3 decodes the instruction immediately before the compare instruction. Instead of the instruction immediately before the compare instruction, any instruction may be used if only it was executed before the compare instruction.

Further, in this embodiment, when the address of an instruction under decoding by the instruction decoding unit hits the address tag field 401d and a taken branch is predicted, the instruction pre-fetch unit 1 cancels the pre-fetched instruction and starts pre-fetching a new branch target instruction. Instead, the first pre-fetched instruction may not be canceled but stored, so that when the prediction becomes false and the branch is not taken, the stored instruction is read out and sent to the instruction decoding unit 2.

Still further, in this embodiment, the history storage unit 4d and branch prediction unit 5d predict the branch of the branch instruction on the basis of the history of the singular latest execution of its branch instructions. Instead, the branch may be predicted on the basis of the history of a plural latest execution of its branch instruction.

Further, in this embodiment, if the branch prediction is judged as false, the contents of the candidate address field 403d are replaced with the contents of the secondary candidate address field 404d. Instead, the branch target address may be stored always in the candidate address field 403d, and the address of the instruction following the branch instruction in the secondary candidate address field 404d, so that when the address under decoding by the instruction decoding unit 2 hits the address tag field 401d, the contents of the candidate address field 403d are sent to the instruction pre-fetch unit 1 if the taken prediction field 408d is "1", and the contents of the secondary candidate address field 404d if "0".

As described so far, according to the present invention, one or both of the branch instruction and compare instruction can be executed with zero execution clock count when a series of instruction executed in the past is again executed, thereby allowing considerable practical advantages.

We claim:

1. A data processor for executing a plurality of predetermined instructions cyclically, comprising:
   an instruction execution unit for executing a first one of the instructions;
   an instruction decoding unit for decoding a second one of the instructions following said first instruction while said instruction execution unit is executing said first instruction;
   an instruction pre-fetch unit for pre-fetching a third one of the instructions following said second instruction while said instruction decoding unit is decoding said second instruction;
   a history storage unit for storing, if a fifth one of the instructions succeeding to a fourth one of the instructions is an unconditional branch instruction, an address of a sixth one of the instructions, to which said fifth instruction is branched, and an address of a preceding instruction preceding to said fourth instruction, when said fifth instruction is executed at least in a first cycle of the cyclic executions of said instructions; and
   a pre-branch unit for searching said history storage unit for its contents, while said instruction decoding unit decodes said preceding instruction, and (i) outputting the address of said sixth instruction to said instruction pre-fetch unit, when the address of said preceding instruction is stored in said history storage unit, so that said instruction execution unit executes said sixth instruction after execution of said fourth instruction and (ii) when the address of said preceding instruction is not stored in said history storage unit, causing said instruction execution unit to execute said fifth instruction after execution of said fourth instruction.

2. A data processor for executing a plurality of predetermined instructions cyclically, comprising:
   an instruction execution unit for executing a first one of the instructions;
   an instruction decoding unit for decoding a second one of the instructions following said first instruction while said instruction execution unit is executing said first instruction;
   an instruction pre-fetch unit for pre-fetching a third one of the instructions following said second instruction while said instruction decoding unit is decoding said second instruction;
   a history storage unit for storing, if a fifth one of the instructions succeeding to a fourth one of the instructions is an unconditional branch instruction, a pre-fetched instruction code of a sixth one of the instructions, to which said fifth instruction is branched, an address used for pre-fetching an instruction succeeding to said sixth instruction, and an address of said fourth instruction, when said fifth instruction is executed at least in a first cycle of cyclic executions of said instructions; and
   a pre-branch unit for searching said history storage unit for its contents, while said instruction decoding unit decodes said fourth instruction, and (i) outputting the instruction code of said sixth instruction to said instruction decoding unit and the address used for pre-fetching the instruction succeeding to said sixth instruction to said instruction pre-fetch unit, when the address of said fourth instruction is stored in said history storage unit, so that said instruction execution unit executes said sixth instruction after execution of said fourth instruction and (ii) when the address of said fourth instruction is not stored in said history storage unit, causing said instruction execution unit to execute said fifth instruction after execution of said fourth instruction.

3. A data processor for executing a plurality of predetermined instructions cyclically, comprising:
   an instruction execution unit for executing a first one of the instructions;

an instruction decoding unit for decoding a second one of the instructions following said first instruction while said instruction execution unit is executing said first instruction;

an instruction pre-fetch unit for pre-fetching a third one of the instructions following said second instruction while said instruction decoding unit is decoding said second instruction;

a history storage unit for storing, (i) if a fifth one of the instructions succeeding to a fourth one of the instructions is a conditional branch instruction which may branch to a seventh one of the instructions in accordance with an execution result of said fourth instruction and a conditional branch of said fifth instruction is not taken, an address of a sixth one of the instructions which is succeeding to said fifth instruction and being processed in said instruction decoding unit, a condition code for judging the conditional branch of said fifth instruction, an address of a preceding instruction preceding said fourth instruction, and an address of said seventh instruction, when said fifth instruction is executed at least in a first cycle of cyclic executions of said instructions, and (ii) if said fifth instruction is a conditional branch instruction which may branch to said seventh instruction in accordance with an execution result of said fourth instruction and a conditional branch of said fifth instruction is taken, an address of said seventh instruction, a condition code for judging the conditional branch of said fifth instruction, an address of a preceding instruction preceding to said fourth instruction, and an address of said sixth instruction, when said fifth instruction is executed at least in a first cycle of the cyclic executions of said instructions;

a branch prediction unit for searching said history storage unit for its contents, while said instruction decoding unit decodes said preceding instruction, and (a) outputting the address of said sixth or seventh instruction to said instruction pre-fetch unit, when the address of said preceding instruction is stored in said history storage unit, so that said instruction execution unit executes said sixth or seventh instruction after execution of said fourth instruction and (b) when the address of said preceding instruction is not stored in said history storage unit, causing said instruction execution unit to execute said fifth instruction after execution of said fourth instruction; and a branch verification unit for verifying, while said instruction execution unit executes said sixth or seventh instruction, whether an instruction currently being executed by said instruction execution unit is an instruction to be executed after said fourth instruction, in accordance with the condition code in said history storage unit, and outputting a signal, when an instruction now executed is not an instruction to be executed, to said instruction execution unit and said instruction decoding unit and said instruction pre-fetch unit so that said instruction execution unit cancels an execution result of said sixth or seventh instruction and executes said seventh or sixth instruction respectively after execution of said fourth instruction.

4. A data processor for executing a plurality of predetermined instructions cyclically, comprising:

an instruction execution unit for executing a first one of the instructions;

an instruction decoding unit for decoding a second one of the instructions following said first instruction while said instruction execution unit is executing said first instruction;

an instruction pre-fetch unit for pre-fetching a third one of the instructions following said second instruction while said instruction decoding unit is decoding said second instruction;

a history storage unit for (i) storing, if a fifth one of the instructions succeeding to a fourth one of the instructions is a conditional branch instruction which may branch to a seventh one of the instructions in accordance with an execution result of said fourth instruction and a conditional branch of said fifth instruction is not taken, a pre-fetched instruction code of a sixth one of the instructions which is succeeding to said fifth instructions, an address used for pre-fetching an instruction succeeding to said sixth instruction, a condition code for judging the conditional branch of said fifth instruction, an address of said fourth instruction and an address of said seventh instruction, when said fifth instruction is executed at least in a first cycle of cyclic executions of said instructions, and (ii) if said fifth instruction is a conditional branch instruction which may branch to said seventh instruction in accordance with an execution result of said fourth instruction and a conditional branch of said fifth instruction is taken, a pre-fetched instruction code of said seventh instruction, an address used for pre-fetching an instruction succeeding to said seventh instruction, a condition code for judging the conditional branch of said fifth instruction, an address of said fourth instruction, and an address of said sixth instruction, when said fifth instruction is executed at least in a first cycle of the cyclic executions of said instructions;

a branch prediction unit for searching said history storage unit for its contents, while said instruction decoding unit decodes said fourth instruction, and (a) outputting the instruction code of said sixth or seventh instruction to said instruction decoding unit and the address used for pre-fetching the instruction succeeding to said sixth or seventh instruction to said instruction pre-fetch unit, when the address of said fourth instruction is stored in said history storage unit, so that said instruction execution unit executes said sixth or seventh instruction after execution of said fourth instruction and (b) when the address of said fourth instruction is not stored in said history storage unit, causing said instruction execution unit to execute said fifth instruction after execution of said fourth instruction; and a branch verification unit for verifying, while said instruction execution unit executes said sixth or seventh instruction, whether an instruction currently being executed by said instruction execution unit is an instruction to be executed after said fourth instruction, in accordance with the condition code in said history storage unit, and outputting a signal, when an instruction now executed is not an instruction to be executed, to said instruction execution unit and said instruction decoding unit and said instruction pre-fetch unit so that said instruction execution unit cancels an execution result of said sixth or seventh instruction and executes said seventh or sixth instruction respectively after execution of said fourth instruction.

5. A data processor for executing a plurality of predetermined instructions cyclically, comprising:

an instruction execution unit having at least a general register for executing a first one of the instructions;

an instruction decoding unit for decoding a second one of the instructions following said first instruction while said instruction execution unit is executing said first instruction;

an instruction pre-fetch unit for pre-fetching a third one of the instructions following said second instruction while said instruction decoding unit is decoding said second instruction;

a history storage unit for storing, if a fifth one of the instructions succeeding to a fourth one of the instructions is a comparison instruction which compares two general register contents or one general register content with immediate data, an address of a sixth one of the instructions which is succeeding to said fifth instruction and being processed in said instruction decoding unit, an information designating said general register contents or said immediate data for a comparison of said fifth instruction, and an address of a preceding instruction preceding to said fourth instruction, when said fifth instruction is executed at least in a first cycle of cyclic executions of said instructions;

a compare instruction remove unit for searching said history storage unit for its contents, while said instruction decoding unit decodes said preceding instruction, and (i) outputting the address of said sixth instruction to said instruction pre-fetch unit, when the address of said preceding instruction is stored in said history storage unit, so that said instruction execution unit executes said sixth instruction after execution of said fourth instruction and (ii) when the address of said preceding instruction is not stored in said history storage unit, causing said instruction execution unit to execute said fifth instruction after execution of said fourth instruction; and a comparison unit for carrying out the comparison of said fifth instruction, while said instruction execution unit executes said sixth instruction, by using the information in said history storage unit and outputting a comparison result to said instruction execution unit.

6. A data processor for executing a plurality of predetermined instructions cyclically, comprising:

an instruction execution unit having at least a general register for executing a first one of the instructions;

an instruction decoding unit for decoding a second one of the instructions following said first instruction while said instruction execution unit is executing said first instruction;

an instruction pre-fetch unit for pre-fetching a third one of the instructions following said second instruction while said instruction decoding unit is decoding said second instruction;

a history storage unit for storing, if a fifth one of the instructions succeeding to a fourth one of the instructions is a comparison instruction which compares two general register contents or one general register content with immediate data, a pre-fetched instruction code of a sixth one of the instructions which is succeeding to said fifth instruction, an address used for pre-fetching an instruction succeeding to said sixth instruction, an information designating said general register contents or said immediate data for a comparison of said fifth instruction, and an address of said fourth instruction, when said fifth instruction is executed at least in a first cycle of cyclic executions of said instructions;

a compare instruction remove unit for searching said history storage unit for its contents, while said instruction decoding unit decodes said fourth instruction, and (i) outputting the instruction code of said sixth instruction to said instruction decoding unit and the address used for pre-fetching the instruction succeeding to said sixth instruction to said instruction pre-fetch unit, when the address of said fourth instruction is stored in said history storage unit, so that said instruction execution unit executes said sixth instruction after execution of said fourth instruction and (ii) when the address of said fourth instruction is not stored in said history storage unit, causing said instruction execution unit to execute said fifth instruction after execution of said fourth instruction; and a comparison unit for carrying out the comparison of said fifth instruction, while said instruction execution unit executes said sixth instruction, by using the information in said history storage unit and outputting a comparison result to said instruction execution unit.

7. A data processor for executing a plurality of predetermined instructions cyclically, comprising:

an instruction execution unit having at least a general register for executing a first one of the instructions;

an instruction decoding unit for decoding a second one of the instructions following said first instruction while said instruction execution unit is executing said first instruction;

an instruction pre-fetch unit for pre-fetching a third one of the instructions following said second instruction while said instruction decoding unit is decoding said second instruction;

a history storage unit for (i) storing, if a fifth one of the instructions succeeding to a fourth one of the instructions is a comparison instruction which compares two general register contents or one general register content with immediate data and a sixth one of the instructions succeeding to said fifth instruction is a conditional branch instruction which may branch to an eighth one of the instructions in accordance with an execution result of said fifth instruction and a conditional branch of said sixth instruction is not taken, an address of a seventh one of the instructions which is succeeding to said sixth instruction and being processed in said instruction decoding unit, an information designating said general register contents or said immediate data for a comparison of said fifth instruction, a condition code for judging a conditional branch of said sixth instruction, and address of a preceding instruction preceding to said fourth instruction, and an address of said eighth instruction, when said sixth instruction is executed at least in a first cycle of cyclic executions of said instructions, and (ii) if said fifth instruction is a comparison instruction which compares two general register contents or one general register content with immediate data and said sixth instruction is a conditional branch instruction which may branch to said eighth instruction in accordance with an execution result of said fifth instruction and a conditional branch of said sixth instruction is taken, an address of said eighth instruction, an information designating said general register contents or said immediate data for a comparison of said fifth instruction, a condition code for judging a conditional branch of said sixth instruction, an address of a preceding instruction preceding to said fourth instruction, and an address of said seventh instruction, when said sixth instruction is executed at least in a first cycle of the cyclic executions said instructions;

a branch prediction unit for searching said history storage unit for its contents, while said instruction decoding unit decodes said preceding instruction, and (a) outputting the address of said seventh or eighth instruction to said instruction pre-fetch unit, when the address of said preceding instruction is stored in said history storage unit, so that said instruction execution unit executes said seventh or eighth instruction after execution of said fourth instruction and (b) when the address of said preceding instruction is not stored in said history storage unit, causing instruction execution unit to execute said fifth instruction after execution of said fourth instruction;

a comparison unit for carrying out the comparison of said fifth instruction, while said instruction execution unit executes said seventh or eighth instruction, by using the information in said history storage unit and outputting a comparison result to said instruction execution unit; and a branch verification unit for verifying, while said instruction execution unit executes said seventh or eighth instruction, whether an instruction currently being executed by said instruction execution unit is an instruction to be executed after said fourth instruction, in accordance with the comparison result received from said comparison unit and the condition code in said history storage unit, and outputting a signal, when an instruction now executed is not an instruction to be executed, to said instruction execution unit and said instruction decoding unit and said instruction pre-fetch unit so that said instruction execution unit cancels an execution result of said seventh or eighth instruction and executes said eighth or seventh instruction respectively after execution of said fourth instruction.

8. A data processor for executing a plurality of predetermined instructions cyclically, comprising:

an instruction execution unit having at least a general register for executing a first one of the instructions;

an instruction decoding unit for decoding a second one of the instructions following said first instruction while said instruction execution unit is executing said first instruction;

an instruction pre-fetch unit for pre-fetching a third one of the instructions following said second instruction while said instruction decoding unit is decoding said second instruction;

a history storage unit for (i) storing, if a fifth one of the instructions succeeding to a fourth one of the instructions is a comparison instruction while compares two general register contents or one general register content with immediate data and a sixth one of the instructions succeeding to said fifth instruction is a conditional branch instruction which may branch to an eighth one of the instructions in accordance with an execution result of said fifth instruction and a conditional branch of said sixth instruction is not taken, a pre-fetched instruction code of a seventh one of the instructions which is succeeding to said sixth instruction, an address used for pre-fetching an instruction succeeding to said seventh instruction, an information designating said general register contents or said immediate data for a comparison of said fifth instruction, a condition code for judging a conditional branch of said sixth instruction, an address of said fourth instruction, and an address of said eighth instruction, when said sixth instruction is executed at least in a first cycle of cyclic executions of said instructions, and (ii) if said fifth instruction is a comparison instruction which compares two general register contents or one general register content with immediate data and said sixth instruction is a conditional branch instruction which may branch to said eighth instruction in accordance with an execution result of said fifth instruction and a conditional branch of said sixth instruction is taken, a pre-fetched instruction code of said eighth instruction, an address used for pre-fetching an instruction succeeding to said eighth instruction, an information designating said general register contents or said immediate data for a comparison of said fifth instruction, a condition code for judging a conditional branch of said sixth instruction, an address of said fourth instruction, and an address of said seventh instruction, when said sixth instruction is executed at least in a first cycle of the cyclic executions of said instructions;

a branch prediction unit for searching said history storage unit for its contents, while said instruction decoding unit decodes said fourth instruction, and (a) outputting the instruction code of said seventh or eighth instruction to said instruction decoding unit and the address used for pre-fetching the instruction succeeding to said seventh or eighth instruction to said instruction pre-fetch unit, when the address of said fourth instruction is stored in said history storage unit, so that said instruction execution unit executes said seventh or eighth instruction after execution of said fourth instruction and (b) when the address of said fourth instruction is not stored in said history storage unit, causing said instruction execution unit to execute said fifth instruction after execution of said fourth instruction;

a comparison unit for carrying out the comparison of said fifth instruction, while said instruction execution unit executes said seventh or eighth instruction, by using the information in said history storage unit and outputting a comparison result to said instruction execution unit; and a branch verification unit for verifying, while said instruction execution unit executes said seventh or eighth instruction, whether an instruction currently being executed by said instruction execution unit is an instruction to be executed after said fourth instruction, in accordance with the comparison result received from said comparison unit and the condition code in said history storage unit, and outputting a signal, when an instruction currently being executed is not an instruction to be executed, to said instruction execution unit and said instruction decoding unit and said instruction pre-fetch unit so that said instruction execution unit cancels an execution result of said seventh or eighth instruction and executes said eighth or seventh instruction respectively after execution of said fourth instruction.

* * * * *